(12) United States Patent
Patel et al.

(10) Patent No.: US 9,727,724 B1
(45) Date of Patent: Aug. 8, 2017

(54) MICRO-ARCHITECTURALLY DELAYED TIMER

(71) Applicant: Amazon Technologies, Inc., Seattle, WA (US)

(72) Inventors: Rahul Gautam Patel, Austin, TX (US); William John Earl, Burien, WA (US); Nachiketh Rao Potlapally, Arlington, VA (US)

(73) Assignee: Amazon Technologies, Inc., Seattle, WA (US)

( * ) Notice: Subject to any disclaimer, the term of this patent is extended or adjusted under 35 U.S.C. 154(b) by 360 days.

(21) Appl. No.: 14/509,980

(22) Filed: Oct. 8, 2014

(51) Int. Cl.
 *G06F 21/52* (2013.01)

(52) U.S. Cl.
 CPC .................................. *G06F 21/52* (2013.01)

(58) Field of Classification Search
 None
 See application file for complete search history.

(56) References Cited

U.S. PATENT DOCUMENTS

| | | | |
|---|---|---|---|
| 5,437,047 A | 7/1995 | Nakamura | |
| 5,581,463 A | 12/1996 | Constant et al. | |
| 5,742,792 A | 4/1998 | Yanai et al. | |
| 7,036,002 B1 | 4/2006 | Ugon et al. | |
| 7,054,883 B2 | 5/2006 | Heasley et al. | |
| 8,146,078 B2 | 3/2012 | Bennett et al. | |
| 8,583,467 B1 | 11/2013 | Morris et al. | |
| 8,738,860 B1 | 5/2014 | Joyce et al. | |
| 8,856,400 B1 | 10/2014 | Davidson et al. | |
| 8,972,637 B1 | 3/2015 | Hushon, Jr. et al. | |
| 9,026,694 B1 | 5/2015 | Davidson et al. | |
| 2003/0061262 A1 | 3/2003 | Hahn et al. | |
| 2003/0084336 A1 | 5/2003 | Anderson et al. | |
| 2005/0097556 A1 | 5/2005 | Code et al. | |
| 2007/0136531 A1 | 6/2007 | Liu et al. | |
| 2008/0040481 A1 | 2/2008 | Joshi et al. | |
| 2008/0126820 A1 | 5/2008 | Fraser et al. | |
| 2009/0089564 A1 | 4/2009 | Brickell et al. | |
| 2011/0010461 A1 | 1/2011 | Lassila et al. | |

(Continued)

OTHER PUBLICATIONS

Aciicmez et al., "On the Power of Simple Branch Prediction Analysis", International Association for Cryptologic Research, Oct. 2006, pp. 1-16.

Agosta et al., "Countermeasures for the Simple Branch Prediction Analysis", International Association for Cryptologic Research, Dec. 21, 2006, pp. 1-4.

(Continued)

*Primary Examiner* — Paul Yanchus, III
(74) *Attorney, Agent, or Firm* — Kilpatrick Townsend & Stockton LLP

(57) ABSTRACT

Techniques are described for injecting noise in a timer value provided to an instruction requesting the timer value. A plurality of tasks may execute on a processor, wherein the processor may comprise one or more processing cores and each task may include a plurality of computer executable instructions. In accordance with one technique for injecting noise in the timer value, in response to a request for a timer value, an artificial and indeterminate amount of delay may be introduced before accessing of the timer value from the hardware timer. In one implementation, access to the hardware timer for the timer value may be gated by one or more artificially injected micro-architectural events.

16 Claims, 19 Drawing Sheets

(56) References Cited

U.S. PATENT DOCUMENTS

| | | | |
|---|---|---|---|
| 2011/0055479 A1* | 3/2011 | West | G06F 9/4881 711/118 |
| 2011/0145657 A1 | 6/2011 | Bishop et al. | |
| 2011/0238919 A1 | 9/2011 | Gibson et al. | |
| 2012/0137075 A1 | 5/2012 | Vorbach | |
| 2012/0224482 A1 | 9/2012 | Gramling et al. | |
| 2012/0331464 A1 | 12/2012 | Saito et al. | |
| 2013/0080641 A1 | 3/2013 | Lui et al. | |
| 2013/0304903 A1 | 11/2013 | Mick et al. | |
| 2014/0059551 A1 | 2/2014 | Umanesan et al. | |
| 2014/0075125 A1 | 3/2014 | Biswas et al. | |
| 2014/0201303 A1 | 7/2014 | Dalal et al. | |
| 2014/0201402 A1 | 7/2014 | Dalal et al. | |
| 2014/0372786 A1 | 12/2014 | Wohlgemuth et al. | |
| 2014/0378094 A1 | 12/2014 | Gillick et al. | |
| 2015/0052614 A1 | 2/2015 | Crowell et al. | |
| 2015/0067673 A1* | 3/2015 | Wang | G06F 9/45558 718/1 |
| 2015/0128142 A1 | 5/2015 | Fahim et al. | |
| 2015/0277949 A1 | 10/2015 | Loh et al. | |

OTHER PUBLICATIONS

Page, "Partitioned Cache Architecture as a Side-Channel Defense Mechanism", Internet Citation, Available online at http://citeseer.ist.psu.edu/cache/papers/cs2/433/http:zSzzSzeprint.iacr.orgzSz2005zSz280.pdf/page05partitioned.pdf, 2005, 14 pages.

Percival, "Cache missing for fun and profit", Internet Citation, Available online at www.daemonology.net/papers/htt.pdf, May 2005, pp. 1-13.

Zhou et al., "Side-Channel Attacks: Ten Years After Its Publication and the Impacts on Cryptographic Module Security Testing", International Association for Cryptologic Research, Oct. 2005, pp. 1-34.

U.S. Appl. No. 14/502,891, filed Sep. 30, 2014, Titled: Allocation of Shared System Resources.

U.S. Appl. No. 14/509,984, filed Oct. 8, 2014, Tittle: Noise Injected Virtual Timer.

U.S. Appl. No. 14/566,642, filed Dec. 10, 2014, Titled: Allocating Processor Resources Based on a Service-Level Agreement.

U.S. Appl. No. 14/566,648, filed Dec. 10, 2014, Titled: Allocating Processor Resources Based on a Task Identifier.

Yarom, Yuval and Katrina Falkner. "Flush+Reload: a High Resolution, Low Noise, L3 Cache Side-Channel Attack" *IACR Cryptology ePrint Archive*, 2013: 448, 14 pages.

* cited by examiner

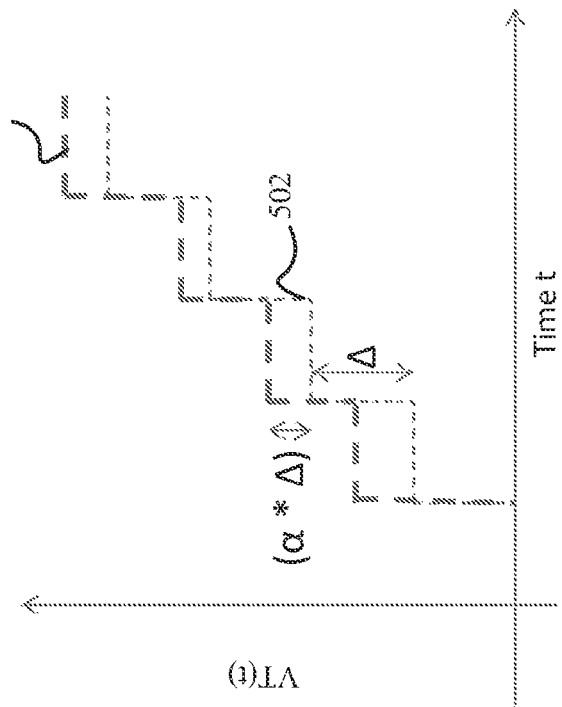
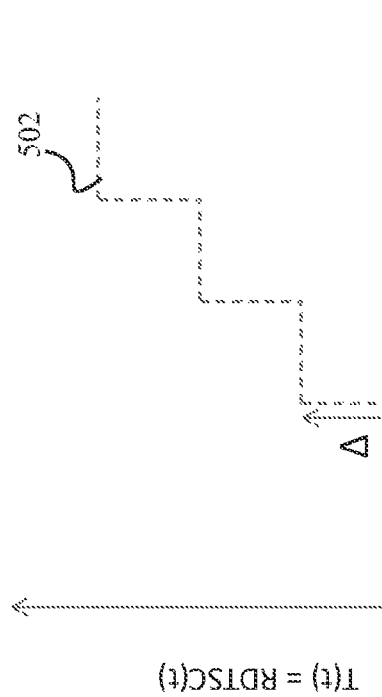
FIG. 5A
FIG. 5B

MICRO-ARCHITECTURALLY DELAYED TIMER

BACKGROUND

Any given computing device may execute several security sensitive and non-security sensitive tasks, simultaneously or near simultaneously, on a computing system. Some non-security sensitive tasks may include malicious tasks that may either subvert the execution of the security sensitive task or steal information from the execution of the security sensitive task. A simple example of a security sensitive task may include a user trying to establish a secure communication session with a backend server, such as a bank, using a web interface to access his or her account information. A malicious task that can gain access to the session key for the secure communication session between the user and the backend server may be able to connect to the backend server and gain access to the user's sensitive information.

In a multi-tenant environment, where multiple tenants or users may concurrently execute tasks on the same computing device, the risk to the security sensitive tasks from potentially executing malicious tasks is exacerbated, since the computing resources of the computing device are no longer dedicated to a single tenant.

BRIEF DESCRIPTION OF DRAWINGS

Various embodiments in accordance with the present disclosure will be described with reference to the drawings, in which:

FIG. 5A is an exemplary graph illustrating the output from a time counter without noise injection;

FIG. 5B is an exemplary graph illustrating the output of a virtual timer module, according to certain aspects disclosed with respect to the FIG. 4 block diagram;

DETAILED DESCRIPTION

Figure 1:
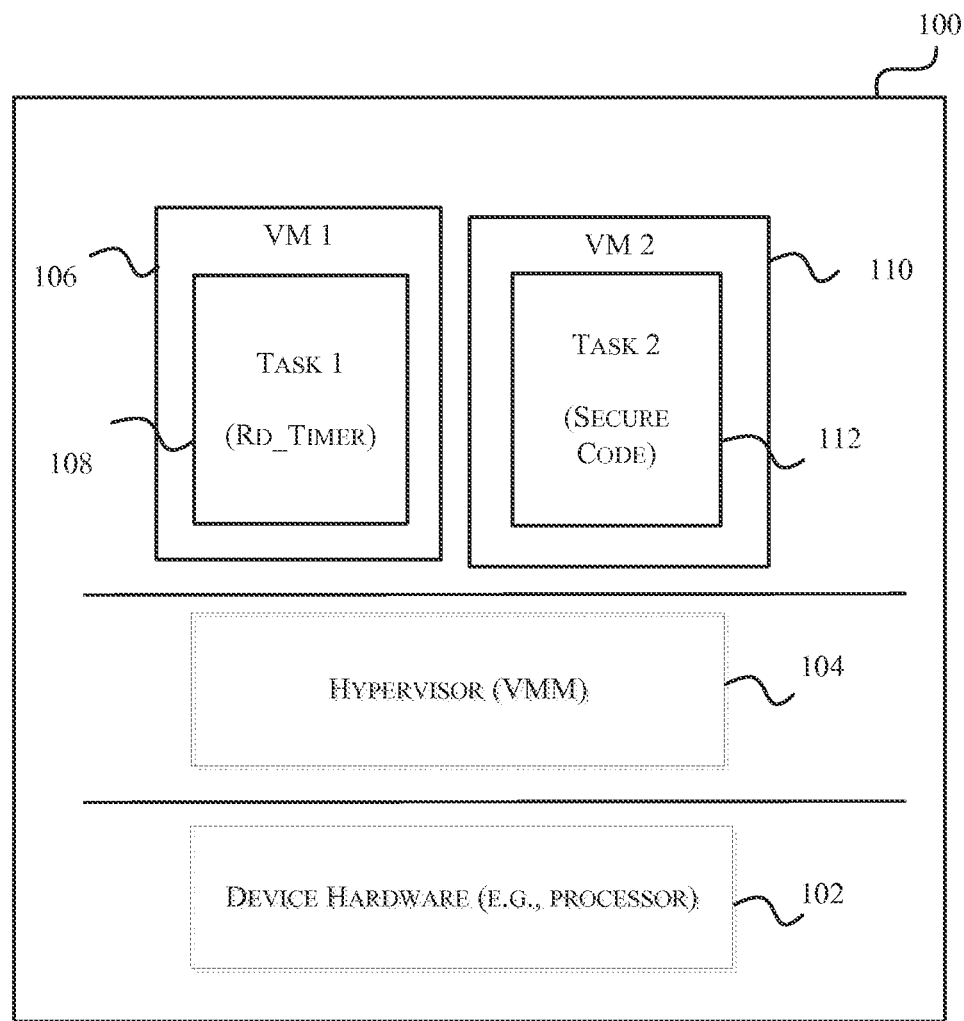
FIG. 1 illustrates an exemplary execution environment in which virtualization technology is used for performing embodiments of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques are described for injecting noise in the timer value, so that an attacker from the malicious task, such as a virtual machine, cannot reliably use the time stamp counter to observe the response time of the shared hardware resources on the processor. According to one example technique, in response to a request for a timer value by instructions executing from within a task, a virtual timer value is received instead of the hardware timer value. The virtual timer value may be derived using at least the timer value and a random value. According to another technique, in response for a request for a timer value, an artificial and indeterminate amount of delay may be introduced before accessing of the timer value from the hardware timer. In one implementation, access to the hardware timer for the timer value may be gated by an artificially injected micro-architectural event.

Current processing and system architectures are capable of executing a plurality of processing tasks simultaneously. These tasks may include a myriad of security sensitive tasks and non-security sensitive tasks. In addition, in some instances, malicious tasks may manage to install themselves and execute alongside security sensitive tasks.

A hardware processor may support the execution of a plurality of processing tasks simultaneously by using multiple cores and/or multi-threading. A processor may include multiple cores and/or multi-threading may provide several logical processors for simultaneously executing and completing the execution of tasks.

A multi-core processor may include multiple processing units within the same processor. In some embodiments, the multi-core processors may share certain resources, such as busses, buffers and second or third level of caches. In some instances, each core in a single or multi-core processor may also include multiple executing logical processors. Such a core that supports multiple logical processors may be referred to as a multi-threaded processor. Besides sharing higher level caches and busses, the tasks executing on a multi-threaded processor may also share several stages of the execution pipeline and lower level caches.

Therefore, in a multi-core and/or multi-threaded processor several hardware resources are shared amongst the various tasks executing on the processor. Examples of these hardware resources include several stages of the execution pipeline of a core, several temporary storage buffers, caches and busses.

A malicious task executing simultaneously, or near simultaneously on the processor along with a security sensitive task may be able to deduce security sensitive information from the security sensitive task by observing the response time of certain hardware resources shared between logical processors supported by the same processor. For example, in certain instances, it may be possible for the malicious task to steal the session key for a secure connection established for a user logged into her bank account through a web browser. Such attacks where a malicious task can steal information for a concurrently running security task by observing a resource shared by the two tasks may be referred to as a side-channel attack.

Side-channel attacks may be particularly concerning in multi-tenant environments, such as cloud services, where the cloud service provider may schedule the processing of tasks from different tenants (e.g., users) on the same processor. In such an environment, the tasks associated with a tenant may be scheduled as an instantiation of an operating environment within a virtual machine. In certain implementation, a virtual machine is an emulation of the underlying hardware. Executing tasks associated with a tenant in a virtual machine enables a processor to service multiple tenants simultaneously or near simultaneously.

In such an execution environment, a malicious tenant executing a malicious task inside a virtual machine (i.e., malicious virtual machine) may be able to steal secrets from another virtual machine executing security sensitive tasks on the same processor.

In one instantiation of the side-channel attacks, a virtual machine executing a malicious task simultaneously, or near simultaneously on the processor along with a virtual machine executing a security sensitive task can deduce security sensitive information from the security sensitive task by observing the response time of certain shared hardware resources. The response time for a shared resource may be measured using a hardware time stamp counter. Orchestrating a side-channel attack would be significantly more difficult without an accurate time stamp counter that has enough granularity to enable detection of the differences between the response times of the shared resources in different states.

In a multi-tenant environment, where multiple tenants or users may concurrently execute tasks on the same computing device, the risk to the security sensitive tasks from potentially executing malicious tasks is exacerbated, since the computing resources of the computing device are no longer dedicated to a single tenant. A multi-tenant environment may refer to an environment where multiple users or accounts, each referred to as a "tenant," may be serviced simultaneously by a computing device and/or the processor of the computing device. For example, in a multi-tenant environment, a processor comprising one or more processing cores and operating in a multi-tenant environment may include one processing core that may simultaneously service instructions associated with two distinct tenants. In some instances, each tenant may be operating as part of a separate virtual machine.

Next, techniques are described for injecting noise in the timer value, so that an attacker from the malicious virtual machine cannot reliably use the time stamp counter to observe the response time of the shared hardware resources on the processor. According to one exemplary technique, in response to a request for a timer value by instructions executing from within a virtual machine, a virtual timer value is received instead of the hardware timer value. The virtual timer value may be derived using at least the timer value and a random value.

In certain embodiments, a timer value may refer to a value provided by a time stamp counter. In certain processor and system architectures, such as the x86 architecture, a time stamp counter may refer to a counter that counts the number of cycles since the processor reset. In one implementation, the time stamp counter value is retrieved by executing the read time stamp counter (RDTSC) instruction. It should be noted, that the means by which the timer value is provided are not limited to the time stamp counter and may include other timers, counters and clock values, provided by the processor, chipset, or any other component on or off the system.

FIG. 1 illustrates an exemplary execution environment in which virtualization technology is used for performing embodiments described herein. Generally, "virtualization technology" may be used for providing isolation between different operating environments sharing the same physical resources. In other words, virtualization may provide a logical abstraction of computing resources from physical constraints. One common abstraction is referred to as a virtual machine (also known as guest), or VM, which provides the content running in the VM a direct interface to the physical hardware while maintaining the abstraction. Generally, virtualization technology allows multiple VMs running on the same physical hardware to operate independently and isolated from each other. The one or more VMs on the system are managed by a Virtualized Machine Monitor, or VMM (also known as hypervisor or host). The VMM is a software or firmware layer responsible for hosting and managing VMs. The VMM usually executes at a higher privilege level than the VMs and manages the system's processor and memory, and allocates other resources for each VM.

FIG. 1 illustrates device hardware 102 executing VMM 104. VMM 104 manages a first VM 106 (VM1) and a second VM 110 (VM2). Device hardware 102 may include one or more processors besides other components for operating a computing system, as described in further detail in FIG. 18 and FIG. 19. In certain implementations, the processors may include hardware support for virtualization technology. For example, INTEL and AMD brand processors provide hardware hooks that support virtualization technology. Qualcomm Incorporated also provides a software abstraction layer which enables multiple operating systems and other clients to execute concurrently on a single processor, through the virtualization and portioning of physical hardware resources. As described above, certain processors may be architected to share hardware resources when possible, for more efficiently utilizing certain hardware components.

For example, multiple processing cores may share caches and certain busses on the processor. Furthermore, in some implementations, multiple execution threads may operate on the same thread sharing the execution pipeline and level 1 and level 2 caches.

In FIG. 1, VMM 104 manages VM1 106 executing a first task 108 and VM2 110 executing a second task 112. In one scenario, second task 112 may be a security sensitive task. An example of a security sensitive task may be an encryption operation performed by second task 112 to establish a secure communication channel with a trusted entity, such as a user logging into their bank account. Another example of a security sensitive task may involve a user encrypting data for safe storage. On the other hand, first task 108 executing in VM1 106 may be a malicious task. As shown in FIG. 1, first task 108 may be configured to execute a read timer command to measure the response time for certain accesses to shared processor resources such as caches, buffers and/or busses.

In certain embodiments, a task may refer to a group of executable instructions. Example of a task may include a processing thread, a process, or an application that may include multiple processes.

Figure 2:
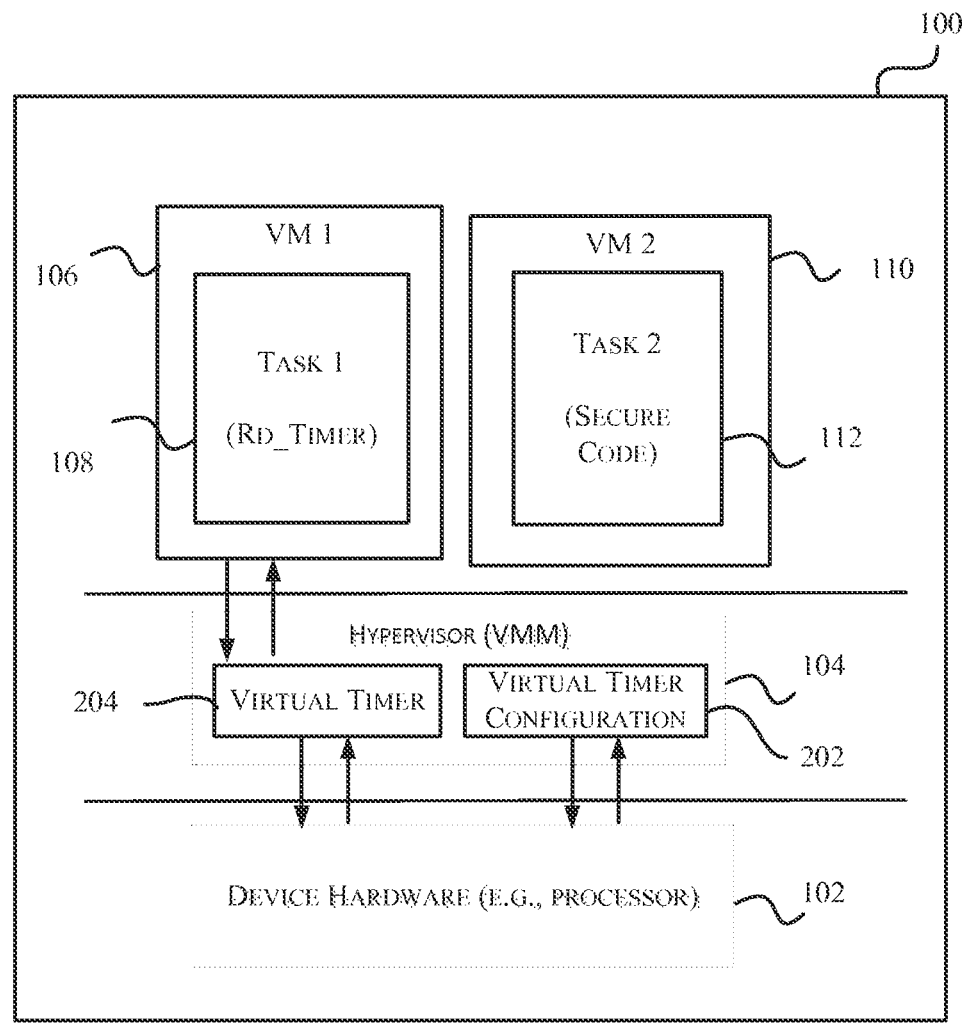
FIG. 2 illustrates a variation of the exemplary execution environment shown in FIG. 1 that is configured to provide a virtual timer value instead of the timer value.

FIG. 2 illustrates a variation of the exemplary execution environment shown in FIG. 1 that is configured to provide a virtual timer value instead of the timer value. FIG. 2 includes virtual timer configuration module 202 and virtual timer module 204. Virtual timer configuration module 202 and virtual timer module 204 are implemented as part of VMM 104. VMM 104 is generally more privileged than the VM's managed by VMM 104.

In certain implementations, virtual timer configuration module 204 may configure VM1 106 such that all requests for reading the timer value from the hardware (e.g., RDTSC) from VM1 106 results in a virtual machine exit (VMexit) to VMM 104. In other words, VM1 106 is configured such that any attempt to read the timer value from VM1 106 results in an automatic transfer of the execution from VM1 106 to VMM 104. Exemplary details of virtual timer configuration module 202 are described with reference to FIG. 11 further below.

Virtual timer module 204 may be configured to provide VM1 106 with a virtual timer value instead of the timer value or the time stamp counter value provided by the hardware. Virtual timer module 204 may inject noise into the reading of the timer value by VM1 106 by deriving the virtual timer value using the timer value and a random number. For example, in certain implementations, virtual timer module 204 may retrieve the timer value from the hardware and replace the last few bits of the timer value with random number bits from a random number generator. Exemplary details of virtual timer module 204 are described with reference to FIGS. 4-10 further below.

In one exemplary scenario, VM1 106 automatically transfers control to VMM 104 upon execution of an instruction that requests the timer value from hardware (e.g., RDTSC). Virtual timer module 204 executing in VMM 104 may generate the virtual timer value using at least the timer value and a random number. VMM 104 populates the appropriate registers in the processor state and returns execution control to VM1 106. VM1 106 continues execution by reading the virtual timer value from the expected registers.

In most instances, virtualization of the read timer resource may not even be noticeable to VM1 106. In other words, according to certain embodiments, code executing within VM1 106 may not be able to differentiate between a timer value and a virtual timer value. When VM1 106 executes the read timer instruction, VM1 106 automatically transfers control to VMM 104. Virtual timer module 204 generates the virtual timer value and returns the execution back to the instruction after the read timer instruction with the virtual timer value as the result (instead of the timer value). From the perspective of VM1 106, the execution returns back as if the read timer value instruction completed successfully. Therefore, a malicious VM executing instructions for reading the timer value from hardware may be completely oblivious to the fact that the timer value is virtualized. In such a virtualized environment, launching a successful side-channel attack by a VM would be unsuccessful since the timer value may no longer be reliable for the purposes of the attack.

Figure 3:
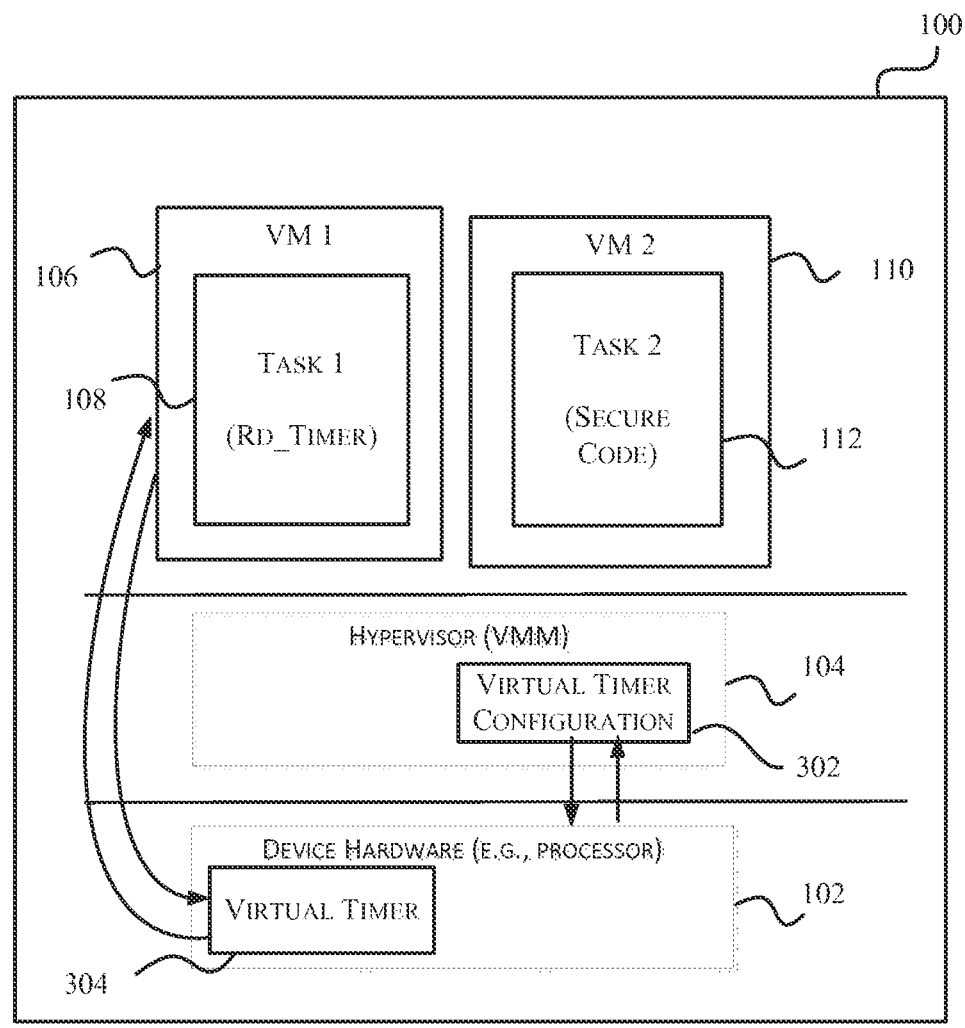
FIG. 3 illustrates another variation of the exemplary execution environment shown in FIG. 1 that is configured to provide a virtual timer value instead of the timer value.

As shown in FIG. 3, virtual timer module 304 may be implemented in hardware. For example, virtual timer module 304 may be implemented in the processor logic. In certain implementations, aspects of virtual timer module 304 may be implemented in processor microcode, processor hardware or any combination thereof Similar to that described with reference to FIG. 2, VM1 106 may be configured by virtual timer configuration module 302. Virtual timer configuration module 302 may dictate the policy for enabling noise injection for the virtual timer and the nature of the noise injection. Exemplary details of virtual timer configuration module 302 are described with reference to FIG. 11 further below.

In FIG. 3, VM1 106 may be configured by VMM 104, using virtual timer configuration module 302, to provide a virtual timer value instead of the timer value for a request for timer value from VM1 106. Once VM1 106 is configured by virtual timer configuration module 302, virtual timer module 304 may provide the virtual timer value to VM1 106 upon request of a timer value. As shown in FIG. 3, the request for the timer value from VM1 106 may be directly handled by virtual timer module 304 implemented in the processor logic without transferring control to VMM 104. In some instances, servicing the request for providing a virtualized timer value instead of the timer value in hardware may be faster than transferring control to VMM 104 and back from VMM 104. Exemplary details of virtual timer module 304 are described with reference to FIGS. 4-10.

Figure 4:
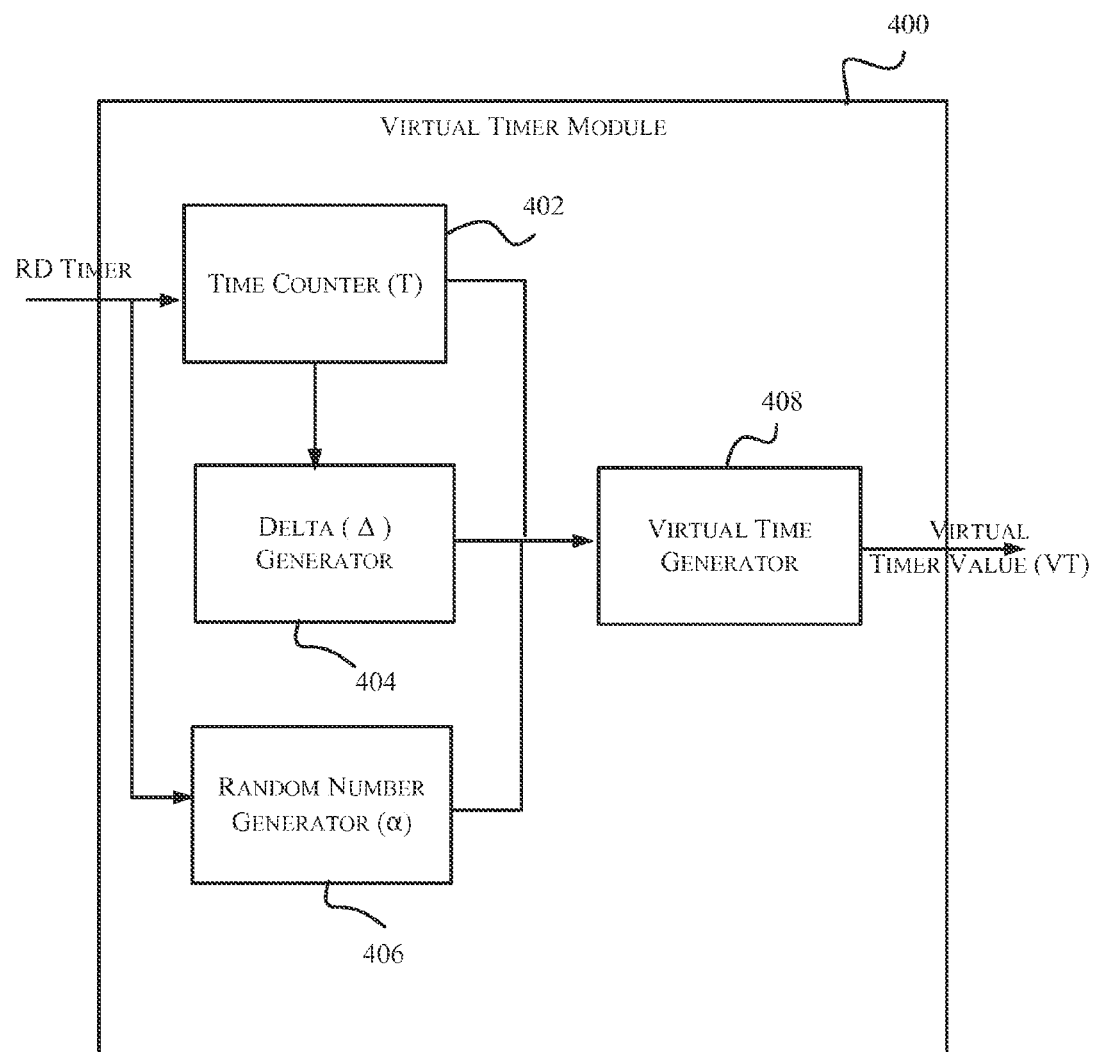
FIG. 4 is a block diagram illustrating exemplary aspects of a virtual timer module, according to certain embodiments of the disclosure.

FIG. 4 is a block diagram illustrating exemplary aspects of the virtual timer module, according to certain embodiments of the disclosure. Virtual timer module 400 may be implemented as part of VMM 104, as discussed with reference to FIG. 2, or as part of device hardware 102, such as the processor (hardware or microcode), as discussed with reference to FIG. 3, or any combination thereof. Furthermore, time counter 402, delta generator 404, random number generator 406 and virtual time generator 408 may all be implemented in hardware, software, firmware (e.g., processor microcode) or any combination thereof. Virtual timer module 400 may be configured to provide the VM with the virtual timer value upon receiving a request for the timer value.

In certain embodiments, time counter (T) 402 provides the counter value maintained by the processor or the computing system. In some instances, a phase locked loop (PLL) may be used for generating a locked output for time counter (T) 402 relative to an input signal. In one example, the input signal for the PLL, also referred to as the reference signal, may be derived from the processor clock or the core cycle counter for each processing core of the processor. Traditionally, in some implementations, the request for the timer value returns the value generated by time counter (T) 402 without any further modifications to the timer value. In certain instruction sets, such as x86 architecture, the read time stamp counter (RDTSC) instruction returns the current time stamp counter value. However, embodiments described herein are not limited to the time stamp counter.

In certain embodiments, random number generator 406 may generate a random number ($\alpha$). Various techniques may be used in generating the random number without deviating from the scope of the disclosure. Furthermore, various entropy sources, individually or in combination with each other may be used in providing quality entropy for the generation of the random number. For example, random number generator 406 may collect entropy from a variety of sources, such as quantum mechanical noise sources, nuclear decay, thermal noise and clock drift. In some instances, random number generator 406 may collect entropy from sources resident on the processor, sources off the processor and any combination thereof. In some implementations, random number generator 406 may generate a random number for each processor core associated with the processor. In some implementations, random number generator 406 may be implemented by the processor, VMM or any other entity, and the virtual timer module may simply request the random number from random number generator 406, instead of implementing a random number generator.

In certain embodiments, delta ($\Delta$) generator 404 derives the time difference between the current timer value (t) and the last timer value (t−1) from time counter 402. In one implementation, the delta generated by delta generator 404 may be represented by the following equation:

$$\Delta = \text{floor}(T(t)-T(t-1)) \text{ where } T(t)=\text{RDTSC}(t) \text{ at time } t$$

Virtual time generator 408 receives input from time counter 402, delta generator 404 and random number generator 406 and generates the virtual timer value. In one exemplary implementation, the virtual timer value generated by virtual time generator 408 may be represented by the following equation:

$$VT(t)=(T(t)+\alpha^*A) \text{ where } T(t)=\text{RDTSC}(t)$$

As illustrated by the above equation and further discussed with reference to FIG. 5B below, the random number (a) offsets the timer value scaled by the difference between two consecutive time counter values (A). Implementation of such a technique may result in increasing the difficulty in mounting a side-channel attack since the attacker can no longer rely on the accuracy of the timer value.

FIG. 5A is an exemplary graph illustrating the output from time counter 402 without noise injection. In FIG. 5A, the x-axis represents time (t) and the y-axis represents the time from time counter 402. In one implementation, the time value for the time counter 402 is generated from the RDTSC instruction. The steps of graph 502 may represent the output of back to back execution of the RDTSC instruction. The graph of time 502 represents the change in time as measured by time counter 402 with respect to the actual passage of time. In FIG. 5A, the change in the timer value between two time cycles (t and t−1) may be represented by A.

FIG. 5B is an exemplary graph illustrating the output of the virtual timer module, according to certain aspects disclosed with respect to FIG. 4. In FIG. 5B, the x-axis represents time (t) and the y-axis represents the output time (i.e., virtual timer value) from virtual timer module 400. Graph 504 is a representation of the virtual timer value with respect to the passage of time, as describe with respect to FIG. 4. The steps of graph 504 may represent the output of back-to-back requests from a VM for the timer value. As seen in FIG. 5B, the steps of graph 504 (representing the value of virtual timer module 400) are offset from the steps of graph 502 (representing the output of time counter 402). According to aspects of the disclosure discussed with reference to FIG. 4, the offset is calculated using the random number ($\alpha$) generated by random number generator 406, but scaled proportionally by the difference between the current timer value and the last timer value (A). Scaling the random number by the difference between the current timer value and the last timer value may help ensure monotonicity of the counter. For example, such a technique may prevent a second request form two back-to-back requests for timer values from virtual timer module 400 to generate a number that is smaller than the previously generated number.

Figure 6:
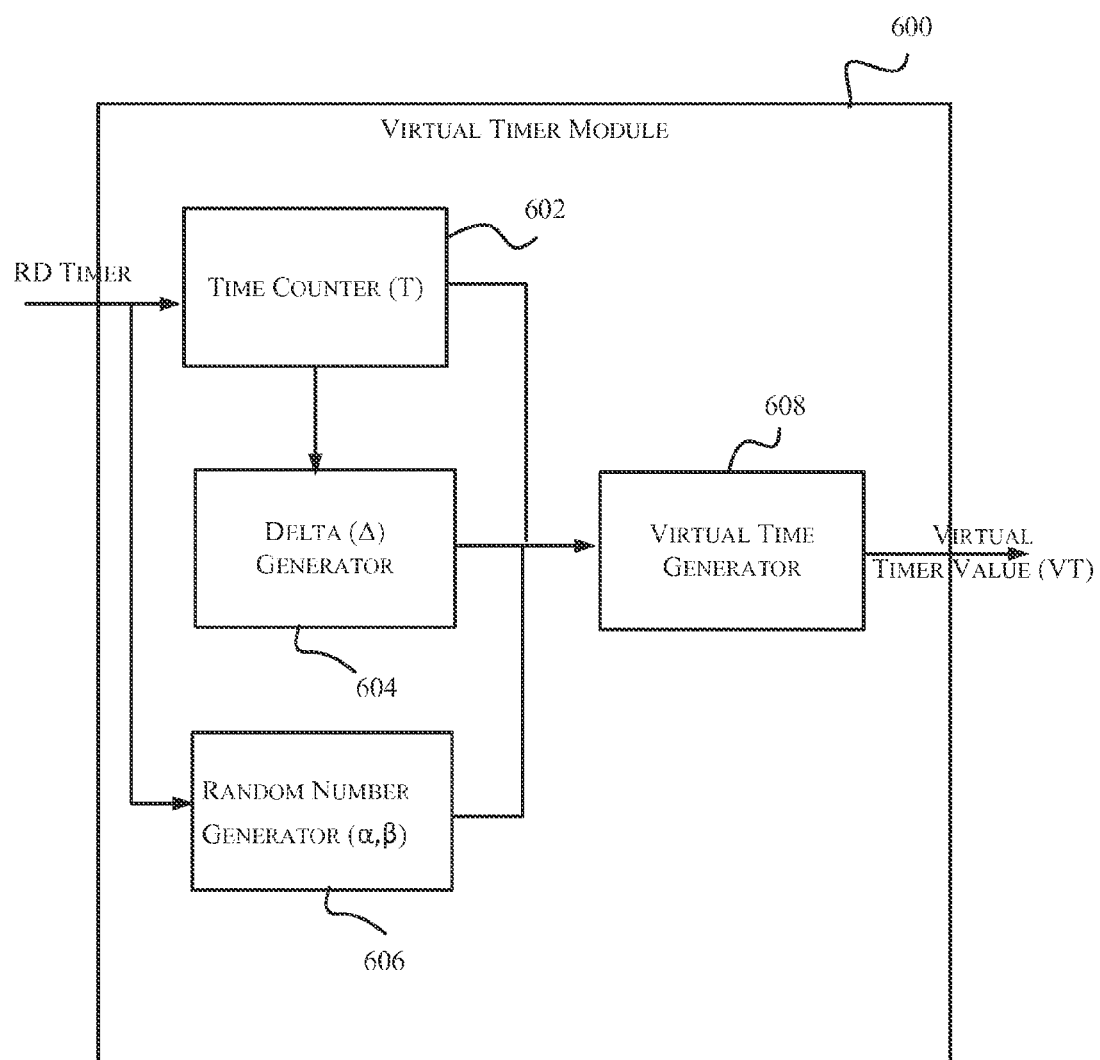
FIG. 6 is a block diagram illustrating exemplary aspects of a virtual timer module, according to certain other embodiments of the disclosure.

FIG. 6 is a block diagram illustrating exemplary aspects of the virtual timer module, according to certain other embodiments of the disclosure. Virtual timer module 600 may be implemented as part of VMM 104, as discussed with reference to FIG. 2, or as part of device hardware 102, such as the processor (hardware or microcode), as discussed with reference to FIG. 3, or any combination thereof. Furthermore, time counter 602, delta generator 604, random number generator 606 and virtual time generator 608 may all be implemented in hardware, software, firmware (e.g., processor microcode) or any combination thereof. Virtual timer module 600 may be configured to provide the VM with the virtual timer value upon receiving a request for the timer value.

In certain embodiments, time counter (T) 602 provides the counter value maintained by the processor. In certain embodiments, time counter (T) 602 may be similar to time counter 402 in FIG. 4.

In certain embodiments, random number generator 606 may generate at least two random numbers ($\alpha,\beta$). Similar to what has been described for random number generator 406 in FIG. 4, various techniques may be used in generating the random number without deviating from the scope of the disclosure. Furthermore, various entropy sources, individually or in combination with each other may be used in providing quality entropy for the generation of the random number. In certain implementations, random number generator 606 may generate two random numbers ($\alpha,\beta$) for each processor core associated with the processor.

In certain embodiments, delta (A) generator 604 derives the time difference between the current timer value (t) and the last timer value (t−1) from time counter 602. In one implementation, the delta generated by delta generator 604 may be represented by the following equation:

$$\Delta = \text{floor}(T(t)-T(t-1)) \text{ where } T(t)=\text{RDTSC}(t) \text{ at time } t$$

Virtual time generator 608 receives input from time counter 602, delta generator 604 and random number generator 606 and generates the virtual timer value. In one exemplary implementation, the virtual timer value generated by virtual time generator 608 may be represented by the following equation:

$$VT(t)=(T(t+t^*\beta)+\alpha^*\Delta) \text{ where } T(t)=\text{RDTSC}(t)$$

As illustrated by the above equation and further discussed with reference to FIG. 7B below, the first random number ($\alpha$) offsets the timer value scaled by the difference between the two time counter values ($\Delta$), whereas the second random number ($\beta$) scales the time for which the output from time counter 602 is used or sampled. Therefore, this technique perturbs the timer value by not only offsetting the timer value generated by a random number, but also offsetting the time at which time counter 602 is sampled. For instance, the virtual timer value (i.e., VT(t)) for time (t) directly depends on the time value sampled from time counter 602 at time $(t+t*\beta)$. This technique further increases the difficulty in mounting a side-channel attack since the attack can no longer rely on the accuracy of the timer value or a relation between the time at which the timer value was returned and the time at which the time was sampled.

Figure 7B:
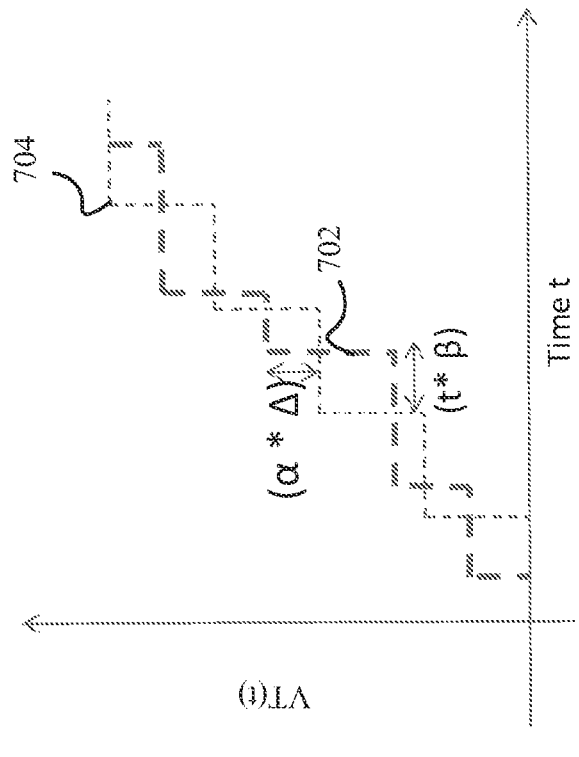
FIG. 7B is an exemplary graph illustrating the output of a virtual timer module, according to certain aspects disclosed with respect to the FIG. 6 block diagram.
Figure 7A:
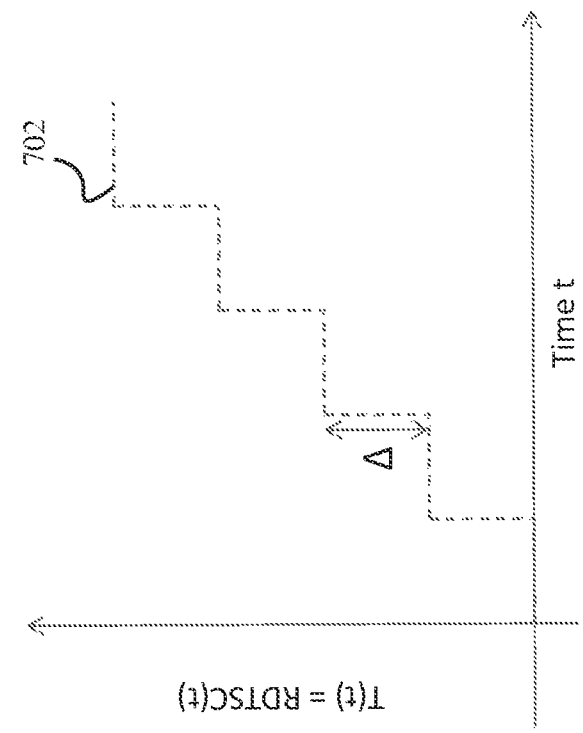
FIG. 7A is an exemplary graph illustrating the output from a timer counter without noise injection.

FIG. 7A is an exemplary graph illustrating the output from a timer counter without noise injection. The exemplary graph in FIG. 7A corresponds to the exemplary graph in FIG. 5A. For example, graph 702 in FIG. 7A corresponds to graph 502 in FIG. 5A. Similarly, delta (A) in FIG. 7A corresponds to delta (A) in FIG. 5A.

FIG. 7B is an exemplary graph illustrating the output of the virtual timer module, according to certain aspects disclosed with respect to the FIG. 6 block diagram. In FIG. 7B, the x-axis represents time (t) and the y-axis represents the output time (i.e., virtual timer value) from virtual timer module 600. Graph 704 is a representation of the virtual timer value with respect to the passage of time, as describe with respect to FIG. 6. The steps of graph 604 may represent the output of back-to-back requests from a VM for the timer value. As seen in FIG. 7B, the steps of graph 704 (representing the value of virtual timer module 600) are offset $(a\alpha*\Delta)$ from the steps of graph 702 (representing the output of time counter 602) by a random scaled value. In addition, the time at which the time counter is sampled may also be offset $(t*\beta)$ by a random scale. Such a technique amplifies the level of difficulty in relying on the timer values by a malicious task executing from a VM in performing a side-channel attack or any other attack that utilizes the timer values. The timer is perturbed using a random number both in the value and the relation between the time at which the timer value was returned and the time at which the time was sampled.

Figure 8:
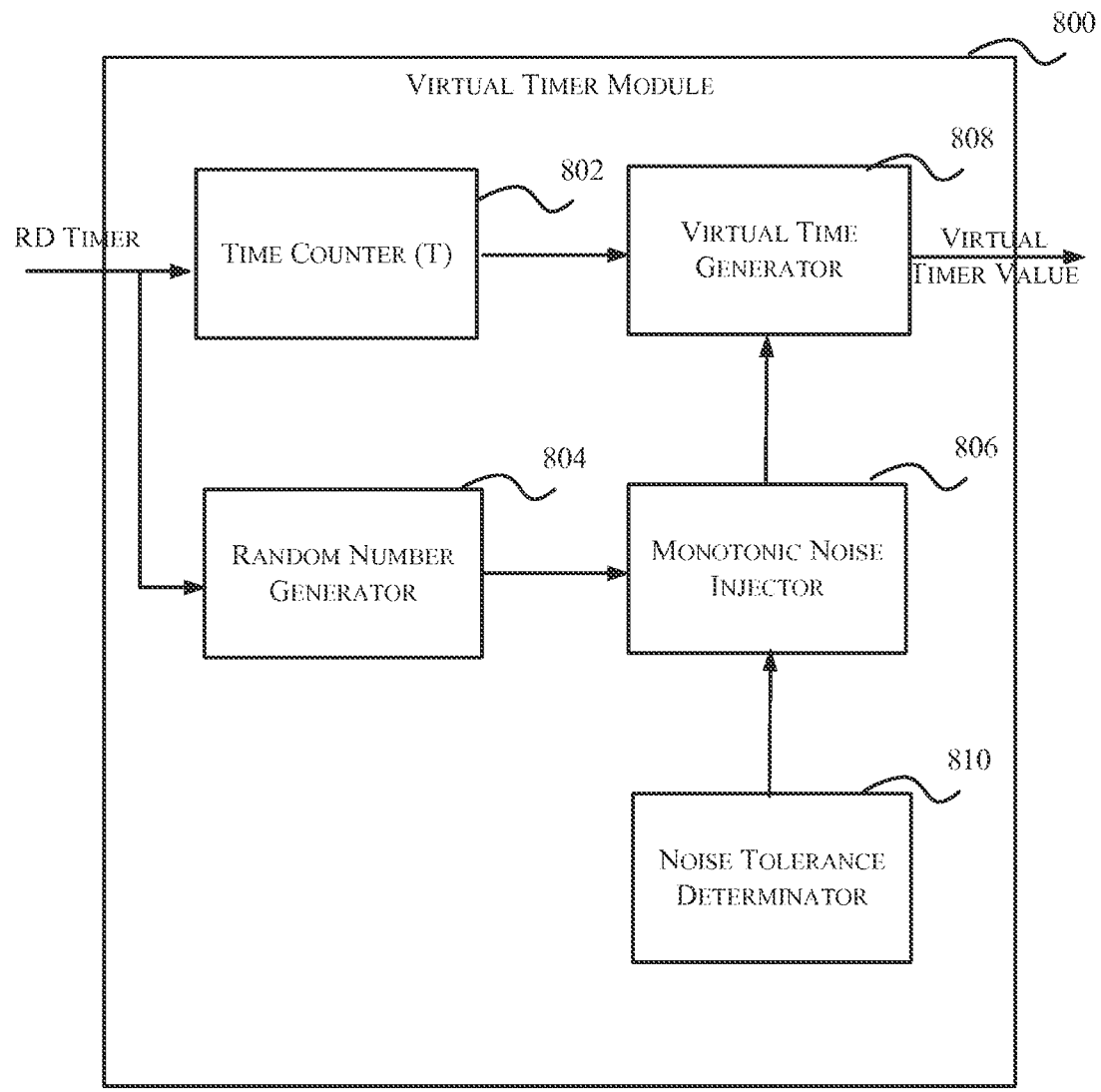
FIG. 8 is another block diagram illustrating exemplary aspects of a virtual timer module, according to certain other embodiments of the disclosure.

FIG. 8 is another block diagram illustrating exemplary aspects of the virtual timer module, according to certain other embodiments of the disclosure. Virtual timer module 800 may be implemented as part of VMM 104, as discussed with reference to FIG. 2, or as part of device hardware 102, such as the processor (hardware or microcode), as discussed with reference to FIG. 3, or any combination thereof. Furthermore, time counter 802, random number generator 804, monotonic noise injector 806, noise tolerance determinator 810 and virtual time generator 808 may all be implemented in hardware, software, firmware (e.g., processor microcode) or any combination thereof. Virtual timer module 800 may be configured to provide the VM with the virtual timer value upon receiving a request for the timer value.

In certain embodiments, time counter (T) 802 provides the counter value maintained by the processor. In certain embodiments, time counter (T) 802 may be similar to time counter 402 in FIG. 4.

In certain embodiments, random number generator 804 generates a random number. Similar to what has been described for random number generator 406 in FIG. 4, various techniques may be used in generating the random number without deviating from the scope of the disclosure. Furthermore, various entropy sources, individually or in combination with each other may be used in providing quality entropy for the generation of the random number. In certain implementations, the processor may share random number generator 804 amongst one or more processing cores. In other implementations, each processing core associated with the processor may have a dedicated random number generator 804.

In certain aspects, noise tolerance determinator 810 may provide constructs for injecting noise to monotonic noise injector 806. For example, noise tolerance determinator 810 may determine the number of bits of the random number generator to use for injecting noise into the timer value. In one aspect, noise tolerance determinator 810 maintains the monotonicity of the virtual timer value generated by virtual timer module 800 by shaping the injection of noise to the timer value, accordingly.

The software operating inside the VMs may make legitimate (non-malicious) requests for the timer value. However, the software operating inside the VM may not need the level of granularity provided by current hardware timers to operate properly. Therefore, the software may have a certain inherent tolerance for the level of noise injected into the timer value.

In one scenario, the value provided by back-to-back timer reads from the software may result in one such characteristic that may determine the upper bound of noise and/or how noise is injected into the timer value. For example, there may be a minimum number of cycles (referred herein as "Z") within which it may be possible for instructions executing on the processor to perform two back-to-back reads of the timer value while maintaining monotonicity of the timer.

In certain implementations, to produce an obfuscated time value, noise tolerance determinator 810 may determine the number of least significant bits that may be replaced by cryptographic quality random numbers/noise. In one implementation, noise tolerance determinator 810 may determine the number of least significant bits of the timer value which can be directly replaced with an integer less than or equal to $\log_2(Z)$ in order to guarantee monotonicity of the timer values.

For example, if Z=36 cycles, $\log_2(36) \approx 5.1699$, and noise tolerance determinator 810 may then replace at most 5 of the least significant bits of the timer value and still guarantee monotonicity in the worst case.

In one implementation, monotonic noise injector 806 may receive the random number from random number generator 804 and the number of least significant bits of random number generator 804 to be used for noise injection from noise tolerance determinator 810. In one implementation, monotonic noise injector 806 may mask out bits, reduce the number of bits from random number generator 804 or further process the random number from random number generator 806 using the constructs from noise tolerance determinator 810 and send the resultant random number to virtual time generator 808 for generating the virtual timer value.

In one implementation, virtual time generator 808 receives the input timer value from time counter 802 and the resultant random value from monotonic noise injector 806 and generates the virtual timer value. In one implementation, virtual time generator 808 replaces bits from the timer value from time counter 802 with bits from the resultant random value from monotonic noise injector 806 to generate the virtual timer value.

Aspects of the above implementation described with reference to FIG. 8 provide an exemplary technique for injecting noise into the timer value to the extent that the monotonicity of the virtual timer value generated is maintained.

Figure 9:
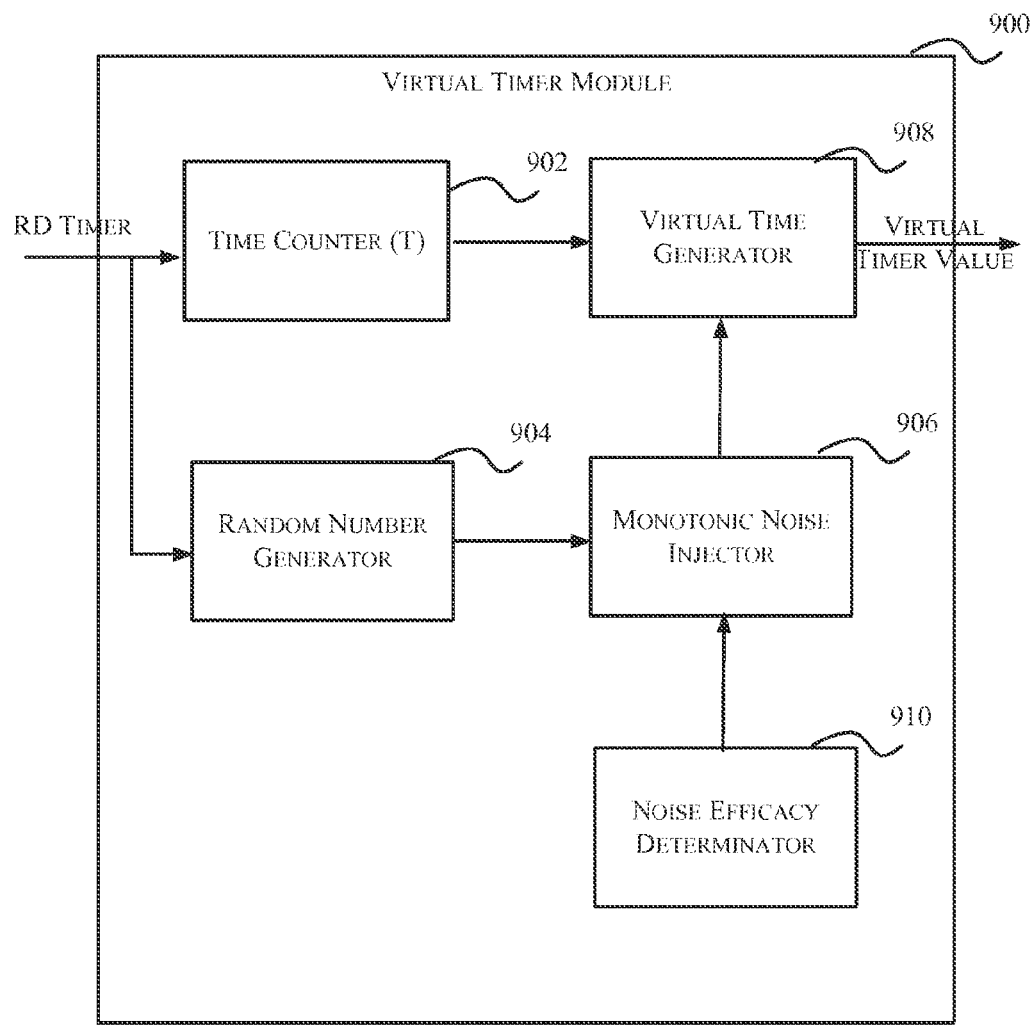
FIG. 9 is yet another block diagram illustrating exemplary aspects of a virtual timer module, according to certain other embodiments of the disclosure.

FIG. 9 is yet another block diagram illustrating exemplary aspects of the virtual timer module, according to certain other embodiments of the disclosure. virtual timer module 900 may be implemented as part of VMM 104 as discussed with reference to FIG. 2 or as part of device hardware 102, such as the processor (hardware or microcode), as discussed with reference to FIG. 3, or any combination thereof. Furthermore, time counter 902, random number generator 904, monotonic noise injector 906, noise efficacy determinator 910 and virtual time generator 908 may all be implemented in hardware, software, firmware (e.g., processor microcode) or any combination thereof. Virtual timer module 900 may be configured to provide the VM with the virtual timer value upon receiving a request for the timer value.

In certain embodiments, time counter (T) 902 provides the counter value maintained by the processor. In certain embodiments, time counter (T) 902 may be similar to time counter 402 in FIG. 4.

In certain embodiments, random number generator 904 generates a random number. Similar to that described for random number generator 406 in FIG. 4, various techniques may be used in generating the random number without deviating from the scope of the disclosure. Furthermore, various entropy sources, individually or in combination with each other may be used in providing quality entropy for the generation of the random number. In certain implementations, the processor may share random number generator 904 amongst one or more processing cores. In other implementations, each processing core associated with the processor may have a dedicated random number generator 904.

In certain aspects, noise efficacy determinator 910 may indicate to monotonic noise injector 910 the lower limits of the amount and type of noise needed for effectively reducing observability by the attacker of the shared micro-architectural structures within the processor using the timer values. For example, for at least some attacks, mounting the side-channel attack becomes more challenging with the number of bits used as noise for the timer since it is harder for the attacker to discriminate the state of micro-architectural structures.

In an exemplary scenario, a typical Level 1 (L1) hit load latency may be 3 cycles, and the typical L1 miss to Level 2 (L2) may be 12 cycles. The difference between the L1 hit and L1 miss to L2 hit is 9 cycles. In such scenario, the attacker must be able to collect enough data samples to distinguish a 9 cycle difference in the access time for the corresponding L1 line in order to discern information about the L1 usage by a security sensitive task. The difference between the access time needed to discern the micro-architectural state of the processor may be referred to as "D."

Noise efficacy determinator 910 may determine that the number of bits of noise that may be needed to obfuscate the access times between the two micro-architectural states of the L1 cache may be greater than or equal to $\log_2(D*N)$, where N is a constant. For the above example, where the constant value for N is 4, then $\log_2(9*4) \approx 4.7549$. In such a scenario, noise efficacy determinator 910 may indicate to monotonic noise injector 906 that 5 (>4.7549) least significant bits of the timer value may be replaced with the noise to reduce the attacker's observability to ¼=25%.

In one implementation, monotonic noise injector 906 may receive the random number from random number generator 904 and the information about the least number of least significant bits of the random number to replace from noise efficacy determinator 910. In one implementation, monotonic noise injector 906 may mask out bits, reduce the number of bits from random number generator 904 or further process the random number from random number generator 906 using the information from noise efficacy determinator 910 and send the resultant random number to virtual time generator 908 for generating the virtual timer value.

In one implementation, virtual time generator 908 receives the input timer value from time counter 902 and the resultant random value from monotonic noise injector 906 and generates the virtual timer value. In one implementation, virtual time generator 908 replaces bits from the timer value from time counter 902 with bits from the resultant random value from monotonic noise injector 906 to generate the virtual timer value.

Figure 10:
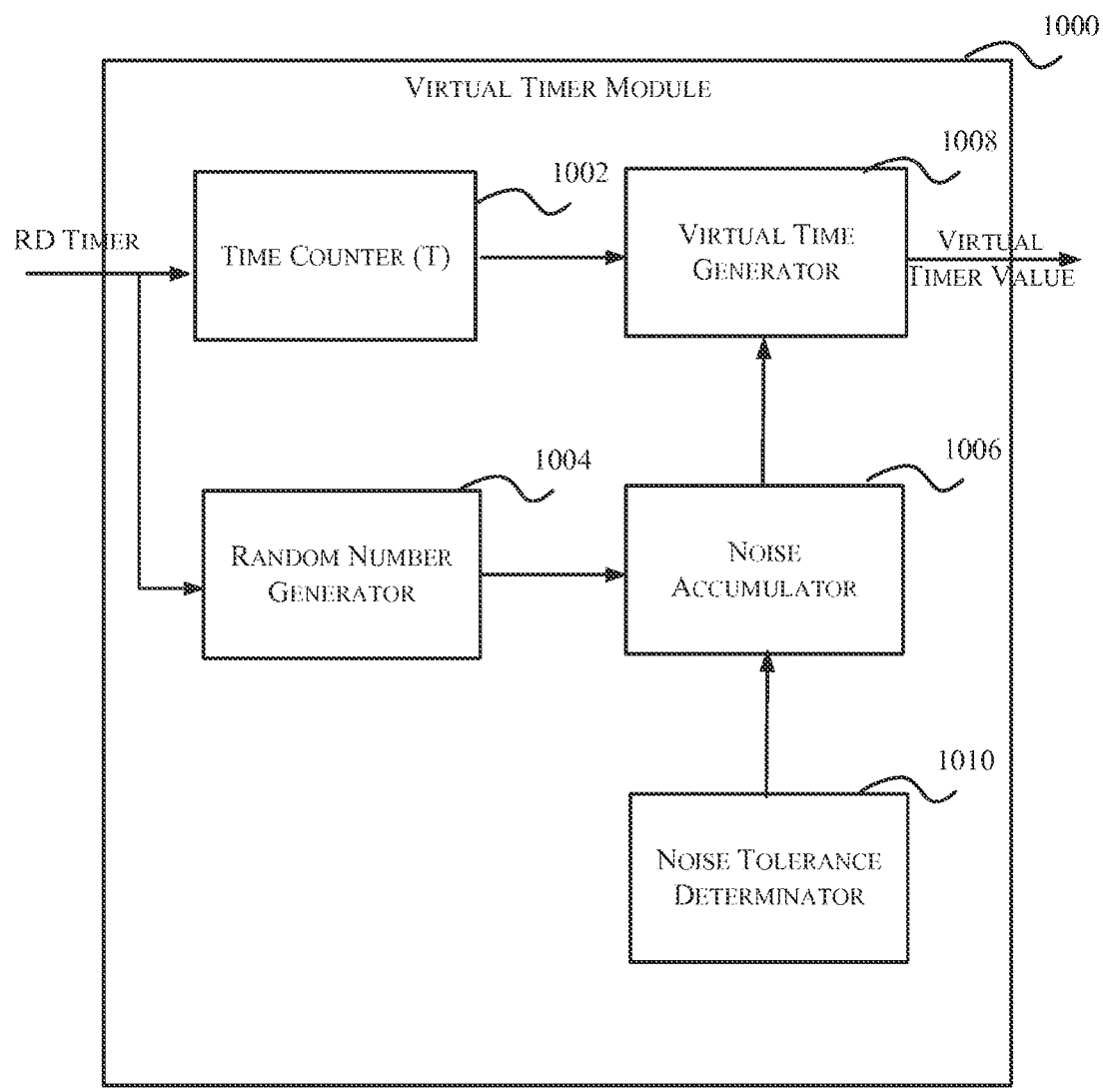
FIG. 10 is still another block diagram illustrating exemplary aspects of a virtual timer module, according to certain other embodiments of the disclosure.

FIG. 10 is still another block diagram illustrating exemplary aspects of the virtual timer module, according to certain other embodiments of the disclosure. Virtual timer module 1000 may be implemented as part of VMM 104 as discussed with reference to FIG. 2, or as part of device hardware 102, such as the processor (hardware or microcode), as discussed with reference to FIG. 3, or any combination thereof. Furthermore, time counter 1002, random number generator 1004, noise accumulator 1006, noise tolerance determinator 1010 and virtual time generator 1008 may all be implemented in hardware, software, firmware (e.g., processor microcode) or any combination thereof. Virtual timer module 1000 may be configured to provide the VM with the virtual timer value upon receiving a request for the timer value.

In certain embodiments, time counter (T) 1002 provides the counter value maintained by the processor. In certain embodiments, time counter (T) 1002 may be similar to time counter 402 in FIG. 4.

In certain embodiments, random number generator 1004 generates a random number. Similar to that described for random number generator 406 in FIG. 4, various techniques may be used in generating the random number without deviating from the scope of the disclosure. Furthermore, various entropy sources, individually or in combination with each other may be used in providing quality entropy for the generation of the random number. In certain implementations, the processor may share random number generator 1004 amongst a plurality of processing cores. In other implementations, each processing core associated with the processor may have a dedicated random number generator 1004.

In certain embodiments, noise accumulator 1006 accumulates the noise over time or over multiple requests, instead of just injecting the noise generated from the current request. Although continuous back-to-back reads of the timer value may be possible, it is expected that in the typical cases reads of the timer value would be relatively much fewer and farther between. In certain implementations, accumulating noise allows achieving greater noise injection while maintaining monotonicity of the virtual timer value and the correct rate of count over long periods of time.

Noise accumulator 1006 adds a new random number (a) every time the timer value is requested. The random number (a) is added to an accumulator (A) for each timer read request, as follows:

$$A = A + \alpha;$$

The accumulator (A) accumulates noise in a relatively large number of bits. In one implementation, the accumulator is a memory location or a register with the same width as the time counter. The random number ($\alpha$) may be generated using the initial random number received form random number generator 1004 and the constraints for the number of bits to be used by noise tolerance determinator 1010.

In certain implementations, the noise tolerance for an implementation using a noise accumulator may be higher than an implementation just replacing the least significant bits of the time counter with the current random value, as describe with reference to FIG. 8. Noise tolerance determinator 810 in FIG. 8 may be limited in the amount of injected noise to $\log_2(Z)$, where Z may refer to the minimum number of cycles within which it may be possible for instructions executing on the processor to perform two back-to-back reads of the timer value while maintaining monotonicity of the timer. However, if more noise could be injected it would be possible to further occlude the observability of the attacker and thereby reduce the success rate of such side-channel attacks.

Noise tolerance determinator 1010 may allow for a greater amount (or bits) of noise to be injected, while maintaining monotonicity, since the noise is accumulated and the variance in the noise cannot cause the noise in one timer value request to undercut the timer value presented in the previous request for the timer value. Therefore, in certain implementations, noise tolerance determinator 1010 may indicate the desired number of bits to around $\log_2(D)$, where D may be greater than Z.

In one implementation, virtual time generator 1008 receives the input timer value (C) from time counter 1002 and the accumulator value (A) from noise accumulator 1006 and generates the virtual timer value by adding the counter value (C) and the accumulator value (A), as follows:

$$\text{Virtual Timer Value} = C + A$$

Furthermore, in some implementations, in order to maintain the correct rate of time count over the long term, the accumulated noise A may be gradually "burned down" by decrementing once every B number of cycles, where B>1. In certain implementations, for ease of implementation, the designer may select power of 2 values for B. The burn down of A may saturate at zero. In effect, this may cause the sum of C and A (i.e., the virtual timer value) to increment at a slower rate than normal for a certain period of time after a given read of the timer value. In certain implementations, the rate of burn down may be made configurable so that the return to long term normalcy occurs accordingly.

By configuring D and B, a significant increase in D (i.e. significant occlusion of observability by the attacker) can be expected while maintaining relatively normal behavior for the system overall.

Aspects of the exemplary virtual timer modules and the techniques described with reference to FIGS. 4-10 for generating the virtual timer value may be combined with one another without departing from the scope of the disclosure. For example, in one implementation, noise efficacy determinator 910 of FIG. 9 may be used along with noise tolerance determinator 810 of FIG. 8 to determine the amount and nature of the noise injected in the timer value. In another exemplary implementation, noise efficacy determinator 910 of FIG. 9 may be used along with noise accumulator 1006 and noise tolerance determinator 1010 of FIG. 10. Therefore, the methods, techniques and modules described with reference to FIGS. 4-10 may be implemented in various combinations with each other in implementing the virtual timer module without deviating from the scope of the disclosure.

Figure 11:
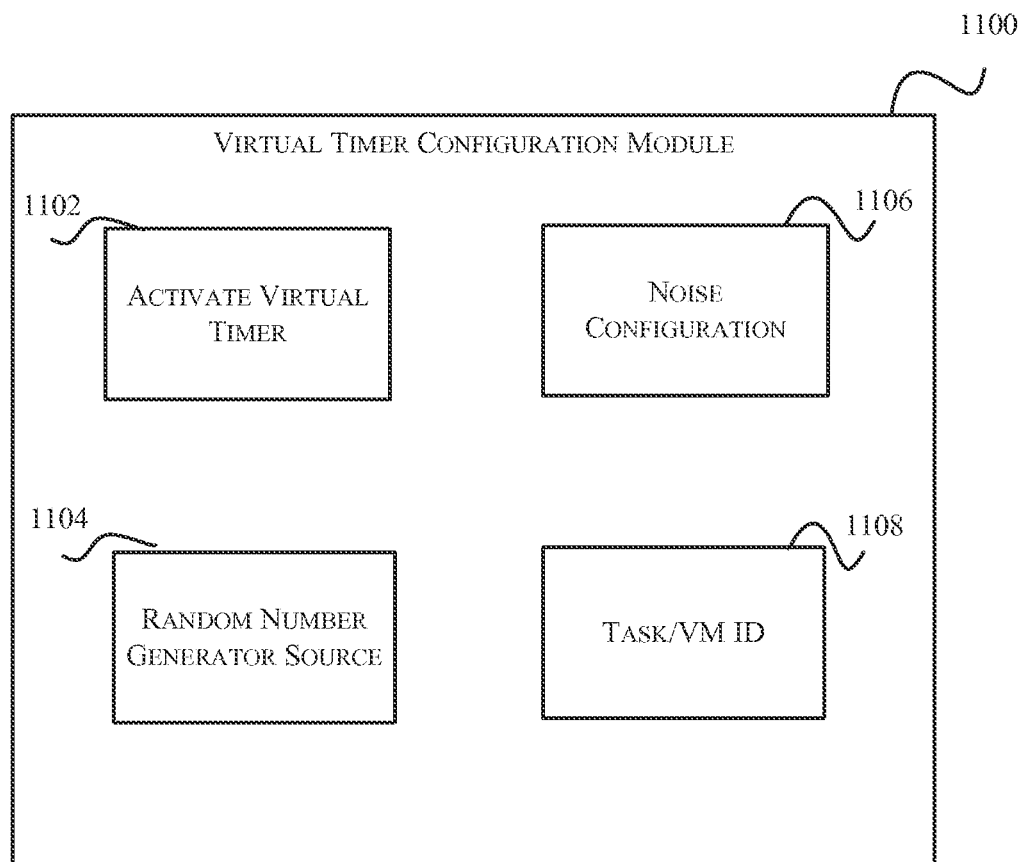
FIG. 11 is a block diagram illustrating exemplary aspects of a virtual timer configuration module, according to certain embodiments of the disclosure.

FIG. 11 is a block diagram illustrating exemplary aspects of the virtual timer configuration module, according to certain embodiments of the disclosure. Virtual timer configuration module 1100 may be implemented as the virtual timer configuration module 202 in FIG. 2 or the virtual timer configuration module 302 in FIG. 3, or any combination thereof. Furthermore, activate virtual timer module 1102, random number generation source module 1104, noise configuration module 1106 and Task/VM ID module 1108 may be implemented in hardware, software, firmware (e.g., processor microcode) or any combination thereof. Virtual timer configuration module 1100 may provide the configuration for the virtual timer modules described in the preceding figures.

In some implementations, virtual timer configuration module 1100 may provide an interface for programming mechanisms and features provided by the processor (hardware or microcode). For example, in one implementation, the processor may provide the configuration registers for enabling/disabling, selecting entropy sources and selecting noise parameters, and virtual timer configuration module 1100 in VMM 104 may program those configuration parameters.

Activate virtual timer module 1102, may activate or deactivate the virtual timer feature. Activate virtual timer module 1102 may provide a combination of settings to activate or deactivate the virtual timer feature globally for the processor, and/or on a per core, per thread, a per task and/or per virtual machine basis. For example, virtual timer module 1102 may set one or more activate bits in one or more configuration registers provided by the processor to activate the virtual timer feature and clear the one or more activate bits to deactivate the virtual timer feature. Several such configuration bits may be provided for activating or deactivating the virtual timer feature on various different granularities.

In certain embodiments, Task/VM ID module 1108 may identify the task and/or VM to activate the virtual timer feature. For example, referring to FIGS. 1-3, VMM 104 may configure Task/VM ID module 1108 to identify and activate the virtual timer feature for VM1 106. The determination of activating the virtual timer may be based on the trust associated with any particular VM. For instance, VMM 104 may choose not to activate the virtual timer feature for a secure and trusted VM, such as VM2 110, but may turn on the virtual timer feature for an untrusted or unknown VM (e.g., VM1 106).

In certain other implementations, a group ID may be used by the Task/VM ID module 608 for identifying and activating the resource allocation feature for a plurality of VMs or Tasks. For example, in one implementation, a mask may be used to select a group of VMs or Tasks.

In certain implementations, random number generator source module 1104 may determine the sources of entropy used for generating the random number generator. For example, several configuration bits may be defined for selecting the various sources of entropy available, such as quantum mechanical noise sources, nuclear decay, thermal noise and clock drift. In some instances, the random number generator source may be present in software, on the processor, off the processor and/or any combination thereof.

In certain implementations, noise configuration module 1106 may help determine the amount and quality of noise injected in the timer value. For example, noise configuration module 1106 may provide certain override features for noise injection parameters for noise injection modules described with reference to FIGS. 4-10, such as the noise tolerance determinator, the monotonic noise injector, the noise accumulator or any other module or component discussed for shaping the noise for the timer value.

Figure 12:
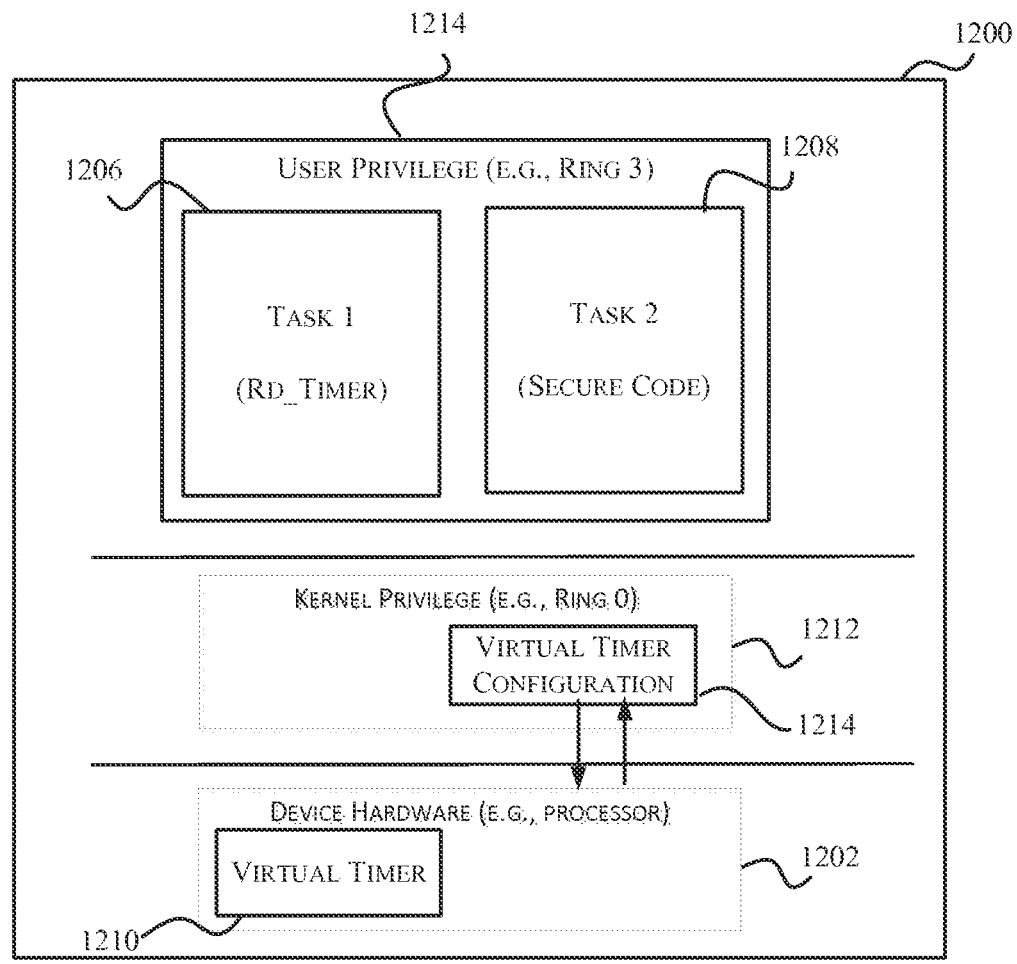
FIG. 12 is a block diagram illustrating techniques for providing a virtual timer value instead of the timer value, according to certain embodiments of the disclosure.

FIG. 12 is a block diagram illustrating techniques for providing a virtual timer value instead of the timer value, according to certain embodiments of the disclosure. Although in FIGS. 1-11 aspects of the disclosure have been described with respect to virtualized environments, embodiments described herein are not limited to such an environment.

FIG. 12 illustrates device hardware 1202 executing privileged code in kernel privilege 1212. Device hardware 1202 may include one or more processors, besides other components for operating a computing system. In certain implementations, the processors may provide hardware support for virtualizing the timer values for specific tasks. Examples of such processors may include but are not limited to Intel®, Qualcomm® and AMD® processors. Similar to what has been discussed before, for example, with reference to FIG. 1, certain processors may be architected to share hardware resources, when possible, for more efficiently utilizing certain hardware components. For example, multiple processing cores may share caches and certain busses on the processor. Furthermore, in some implementations, multiple execution threads may operate on the same processor sharing the execution pipeline and level 1 and level 2 caches. Such sharing of hardware resources between tasks operating on the processor may enable side-channel attacks by a malicious task to retrieve sensitive information from a task executing or that may include sensitive information.

In certain implementations, privileged code/binary executing at kernel privilege 1212 may include operating system code/binary running at very high privilege levels on the device hardware. In certain aspects, the level of privilege may determine the level of direct access and control of the hardware resources. Traditionally, the kernel of the operating systems and drivers operate at kernel privilege level 1212 (e.g., Ring 0 privilege level), and tasks such as applications and processes operate at user privilege level 1214 (e.g., Ring 3 privilege level).

The binary executing at kernel privilege 1212 manages a first task 1206 and a second task 1208. In one scenario, second task 1208 may be a security sensitive task. An example of a security sensitive task may include an encryption operation performed by second task 1208 to establish a secure communication channel, such as a user logging into their bank account. On the other hand, first task 1206 may be a malicious task. As shown in FIG. 12, first task 1206 may be configured to mount a side-channel attack by executing one or more read timer commands to measure the response time for certain accesses to shared processor resources such as caches, buffers and busses.

In certain embodiments, a task may refer to a group of executable instructions. Example of a task may include a processing thread, a process or an application that may include multiple processes.

Furthermore, in certain implementations, FIG. 12 comprises virtual timer configuration module 1214 and virtual timer module 1210. Virtual timer configuration module 1214 may be implemented as part of kernel privilege 1212 in the operating system, and virtual timer module 1210 may be implemented as part of device hardware 1202, such as the processor (hardware or microcode).

In certain implementations, virtual timer configuration module 1214 may configure device 1200 such that all requests for reading the time stamp counter (TSC) from the hardware (e.g., RDTSC) from first task 1206 result are trapped by device hardware 1202. In other words, device 1200 may be configured such that any attempt to read the timer value from first task 1206 results in virtual timer module 1210 returning a virtual timer value instead of the hardware timer value. Virtual timer configuration module 1214 may be implemented using any combination of techniques discussed above with reference to FIG. 11.

Virtual timer module 1210 may be configured to provide first task 1206 with a virtual timer value instead of the timer value or the time stamp counter value provided by the hardware. Virtual timer module 1210 may inject noise into the timer value, by deriving a virtual timer value using the timer value and a random number. For example, in certain implementations, virtual timer module 1210 may retrieve the timer value (e.g., time stamp counter value) from the hardware and replace the last few bits of the timer value with random number bits from the random number generator. Virtual timer module 1210 may be implemented using any combination of techniques discussed with reference to FIGS. 4-10.

Figure 13:
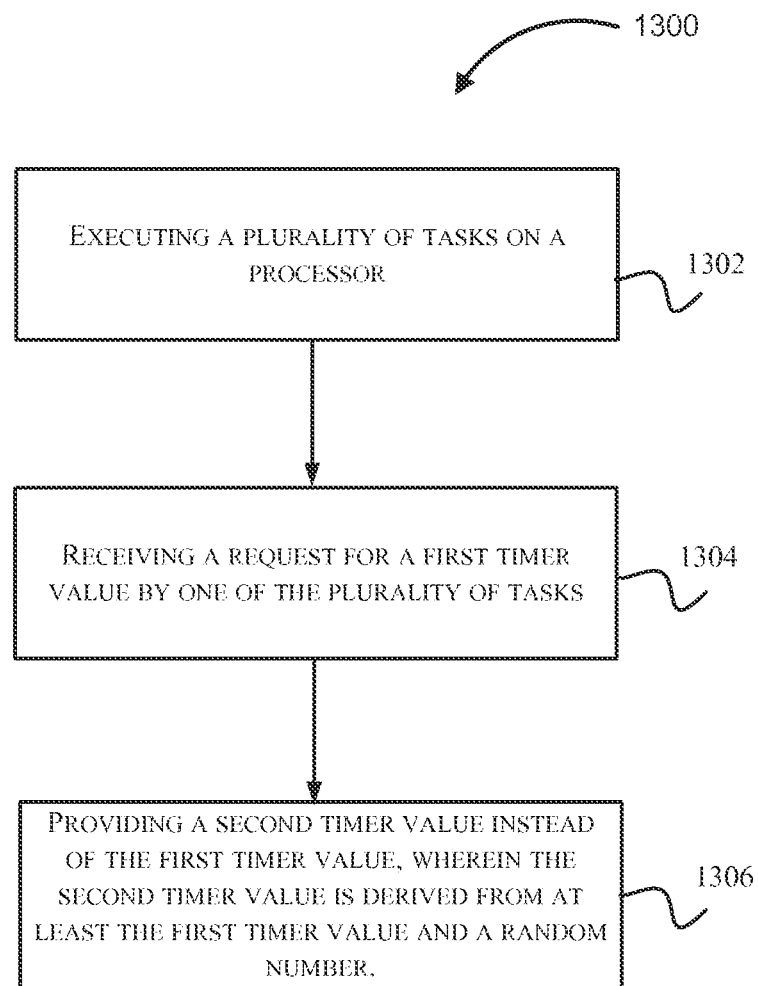
FIG. 13 illustrates a flow diagram for a method for generating a second timer value, according to one or more aspects of the disclosure.

FIG. 13 illustrates a flow diagram for a method for generating a second timer value, according to one or more aspects of the disclosure. Some or all of the process 1300 (or any other processes described herein, or variations and/or combinations thereof) may be performed under the control of one or more computer systems configured with executable instructions and may be implemented as code (e.g., firmware, executable instructions, one or more computer programs or one or more applications) executing collectively on one or more processors, or by hardware or combinations thereof. The code may be stored on a computer-readable storage medium, for example, in the form of a computer program that may include a plurality of instructions executable by one or more processors. The computer-readable storage medium may be non-transitory.

At step 1302, components of the computing device, such as a processor, execute a plurality of tasks on the processor. In certain implementations of the processor, the processor may include one or more logical processors, such multiple processing cores and/or processing threads. Each task may include a plurality of computer executable instructions. Example of a task may include a processing thread, a process or an application that may include multiple processes.

In some aspects, the plurality of tasks executing on the processor share a hardware resource associated with the processor. In some instances, the sharing of the hardware resources may allow one task to spy and steal secrets from another task operating on the processor. Examples of the shared hardware resource may include one or more of a Level 1 cache, a Level 2 cache, a Level 3 cache, Translation Look aside buffer (TLB) and branch prediction cache.

In certain aspects, the plurality of tasks execute using the same execution pipeline on one of the processing cores. In certain other aspects, each of the plurality of tasks are distinct processing threads executing on logical processors associated with the processor. Furthermore, executing two tasks, in some instances, may comprise concurrently processing at least one executable instruction belonging to a first task and at least another executable instruction belonging to a second task, wherein neither of the instructions belonging to the first task or the second task has completed. In some embodiments of the disclosure, each of the plurality of tasks belongs to a separate virtual machine executing on the processor.

At step 1304, components of the computing device, such as a virtual timer module may receive a request for a timer value from a first task from among a plurality of tasks, that may include instructions executing on the processor.

At step 1306, components of the computing device, such as the virtual timer module may be configured to provide a second timer value instead of the first timer value, wherein the second timer value is derived from the first timer value and a random number. The second timer value, such as a virtual timer value, may be generated using any combination of techniques described with reference to FIGS. 4-11. The second timer value may be generated as a monotonic value in relation to the previously generated second timer values. For example, the virtual timer module derives the second timer value such that the second timer value is equal to or greater than a previously derived second timer value.

For example, deriving the second timer value by the virtual timer module, may include accessing the first timer value and accessing the random number. In certain implementations, the first timer value may be the processor clock counter. Furthermore, the virtual timer module, may determine a number of least significant bits of the first timer value to adjust using the random number to derive the second timer value based on the difference in the response time of the shared hardware resource for a plurality of access types. The virtual timer module may further generate the second timer value by adjusting the determined least significant bits of the first timer value using a portion of the random number.

Another exemplary method for generating the second timer value may include accessing the first timer value, accessing the random number, accumulating at least a portion of the random number in an accumulator and adding the first timer value and the accumulator to generate the second timer value.

It should be appreciated that the specific steps illustrated in FIG. 13 provide a particular method of switching between modes of operation, according to one embodiment. Other sequences of steps may also be performed in alternate embodiments. For example, alternative embodiments may perform the steps/blocks outlined above in a different order. To illustrate, a user may choose to change from the third mode of operation to the first mode of operation, the fourth mode to the second mode, or any combination therebetween. Moreover, the individual steps/blocks illustrated in FIG. 13 may include multiple sub-steps that may be performed in various sequences as appropriate to the individual step. Furthermore, additional steps/blocks may be added or removed depending on the particular applications. One of ordinary skill in the art would recognize and appreciate many variations, modifications and alternatives of the process.

In an alternate embodiment, techniques are described for injecting noise in the timer value by delaying the time at which the hardware timer is accessed by a random delay, so that an attacker from a malicious task, such as a virtual machine, cannot reliably use the time stamp counter to observe the response time of the shared hardware resources on the processor. According to one example technique, in response to a request for a timer value, an artificial and indeterminate amount of delay may be introduced before accessing of the timer value from the hardware timer. In one implementation, access to the hardware timer for the timer value may be gated by one or more artificially injected micro-architectural events.

Figure 14:
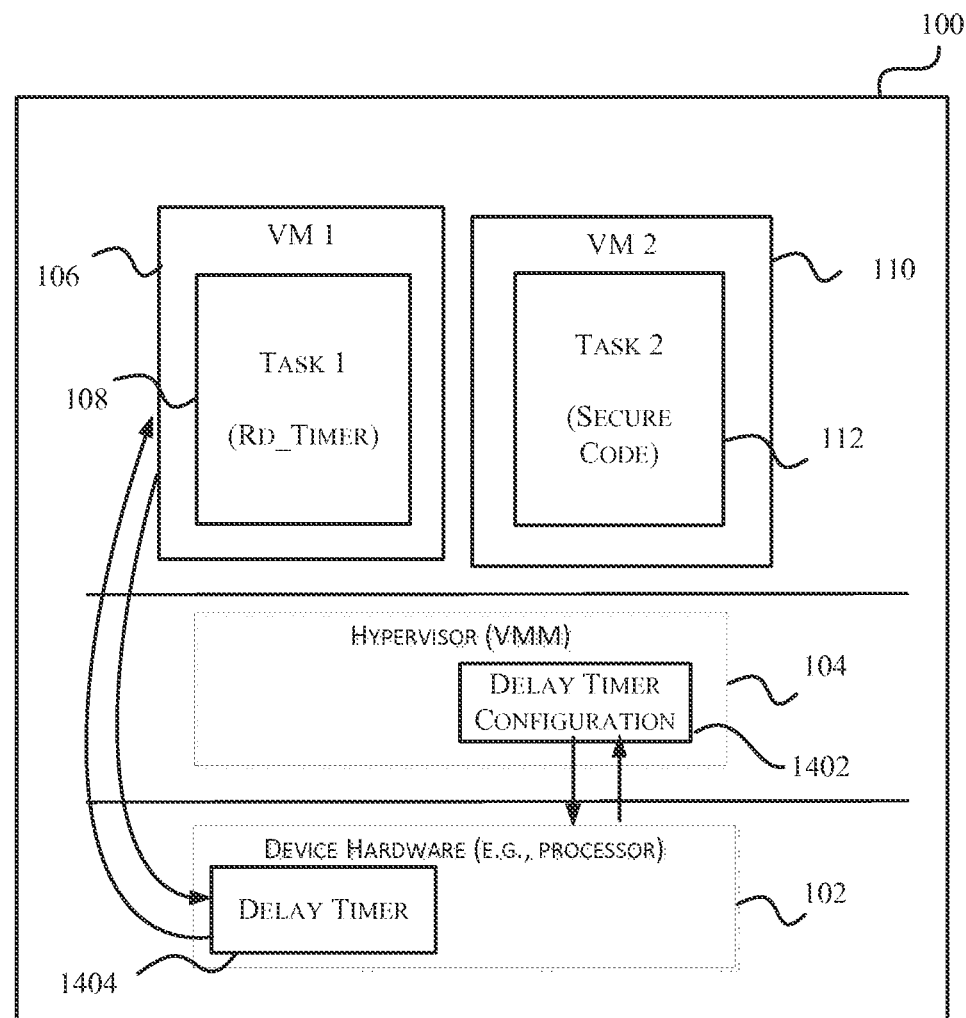
FIG. 14 illustrates a variation of the exemplary execution environment shown in FIG. 1 that is configured to provide a delayed timer value instead of the timer value.

FIG. 14 illustrates a variation of the exemplary execution environment shown in FIG. 1 that is configured to provide a delayed timer value in response to a request for a timer value. The delay in the delayed timer value may be based on a completion of a micro-architectural event introduced before accessing of the timer value from the hardware timer. FIG. 14 includes delay timer configuration module 1402 and delay timer module 1404. The delay timer configuration module 1402 may be implemented as part of VMM 104. VMM 104 is generally more privileged than the VM's managed by VMM 104. The delay timer module 1404 may be implemented in hardware. For example, delay timer module 304 may be implemented in the processor logic. In certain implementations, aspects of delay timer module 1404 may be implemented in processor microcode, processor hardware or any combination thereof.

In certain implementations, delay timer configuration module 1402 may configure VM1 106 such that all requests for reading the timer value from the hardware (e.g., RDTSC) from VM1 106 results in the request being handled by the delay timer module 1404 implemented in the processor logic without transferring control to VMM 104. In one implementation, certain configuration registers may be provided by the processor for enabling the delay timer mechanism in the delay timer configuration module 1402. For example, certain bits may be provided in a machine specific register (MSR) or any other control register for activating and deactivating the delay timer mechanism globally, on a per VM basis or for a group of VMs. In addition to the activation logic, in one implementation, the delay timer configuration module 1402 may include several modules similar to the modules discussed in FIG. 11, such as the random number generator source module 1104 and the task/VM ID 1108 module.

Delay timer module 1404 may be configured to provide VM1 106 with a delayed timer value such as the time stamp counter value provided by the hardware. For example, the delay timer module 1404 may introduce a delay for accessing a timer value in response to a request for the timer value, wherein the delay is based on a completion of a micro-architectural event introduced before accessing of the timer value. The artificially precipitated micro-architectural event injects random delay into the timer value measurements making it difficult to mount timing attacks. Exemplary details of delay timer module 1404 are described in FIG. 15 further below.

In one exemplary scenario, VM1 106 automatically transfers control to delay timer module 1404 implemented in the processor hardware 102 upon execution of an instruction that requests the timer value from hardware (e.g., RDTSC). Delay timer module 1404 executing in VMM 104 may generate the delay timer value. The processor hardware 102 populates the appropriate registers in the processor state and returns execution control to VM1 106. VM1 106 continues execution by reading the virtual timer value from the expected registers.

According to certain embodiments, code executing within VM1 106 may not be able to differentiate between a timer value and a delayed timer value. When VM1 106 executes the read timer instruction, VM1 106 automatically transfers control to device hardware 102. Delay timer module 1404 generates the delayed timer value and returns the execution back to the instruction after the read timer instruction with the delayed timer value as the result. From the perspective of VM1 106, the execution returns back as if the read timer value instruction completed successfully. Therefore, a malicious VM executing instructions for reading the timer value from hardware may be completely oblivious to the fact that the timer value is delayed. In such a virtualized environment, launching a successful side-channel attack by a VM would be unsuccessful since the timer value may no longer be reliable for the purposes of the attack.

Figure 15:
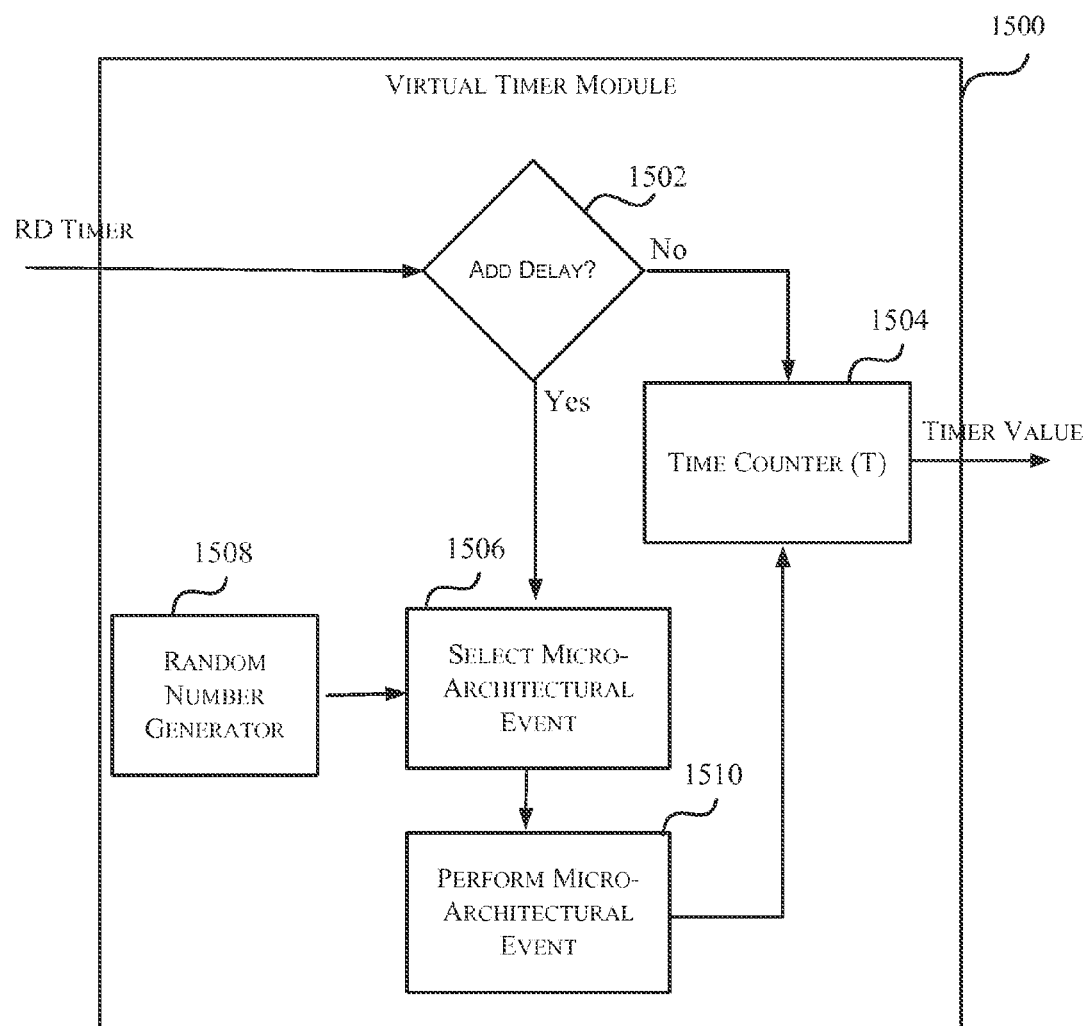
FIG. 15 is a block diagram illustrating exemplary aspects of a delay timer module, according to certain other embodiments of the disclosure.

FIG. 15 is a block diagram illustrating exemplary aspects of the delay timer module, according to certain embodiments of the disclosure. Delay timer module 1500 may be implemented as part of device hardware 102, such as the processor (hardware or microcode), as discussed with reference to FIG. 14. Furthermore, block 1502, time counter 1504, random number generator 1508, select micro-architectural event module 1506 and perform micro-architectural event module 1510 may all be implemented in hardware, firmware (e.g., processor microcode) or any combination thereof. Delay timer module 1500 may be configured to delay accessing a timer value in response to a request for the timer value, wherein the delay is based on a completion of a micro-architectural event introduced before accessing of the timer value from a hardware timer. Therefore, the instructions requesting the time get a different and delayed timer value (e.g., time stamp counter) than the timer value they would have received without performing aspects of this disclosure. The artificially precipitated micro-architectural event injects random delay into the timer value measurements making it difficult to mount timing attacks.

At block 1502, upon request of the timer value by the VM (e.g., execution of RDTSC by a VM1 106), the delay timer module 1500 may determine if the VM is configured to receive a delayed timer value or not. If the VM is a trusted VM, the VM may be configured to access the time counter 1504 without any delay and the execution of the instruction (e.g., RDTSC) may proceed without any further changes. However, in some instances, the delay timer configuration module 1402 may configure the VM to receive a delayed timer value. In one implementation, at block 1502, the device hardware 102 may access a control register, MSR or memory location associated with the configuration for the VM and determine if the VM is configured to receive a delayed timer value.

In certain embodiments, time counter (T) 1504 provides the counter value or time stamp counter maintained by the processor. In certain embodiments, time counter (T) 1502 may be similar to time counter 402 in FIG. 4. If no delay is added, the time counter 1504 provides the resultant timer value and returns back execution to the next instruction. However, if the VM is configured to receive a delayed timer value, the flow proceeds to select micro-architectural event module 1506.

The select micro-architectural event module 1506 may select one or more micro-architectural events from a plurality of events for injecting events into the flow, before allowing access to the timer value. In one instance, the micro-architectural event is injected before allowing access to the timer value solely for the purpose of delaying the access to the timer value by an indeterminate and random amount of time. The micro-architectural event may be randomly selected from a plurality of micro-architectural events. In one example, a random number from the random number generator 1508 may be employed in randomly selecting the micro-architectural event. In one implementation, a single micro-architectural event or a combination of events may be selected. For instance, a 6-bit vector may be randomly generated and events corresponding to the vector may be performed before allowing access to the timer value. For example, 100010=>event 6 and event 2, 110000=>event 6 and event 5, etc.

In certain embodiments, random number generator 1508 generates a random number. Similar to what has been described for random number generator 406 in FIG. 4, various techniques may be used in generating the random number without deviating from the scope of the disclosure. Furthermore, various entropy sources, individually or in combination with each other may be used in providing quality entropy for the generation of the random number. In certain implementations, the processor may share random number generator 804 amongst one or more processing cores. In other implementations, each processing core associated with the processor may have a dedicated random number generator 1508.

At perform micro-architectural event module 1510, once the one or more micro-architectural events are selected, the micro-architectural events are performed by the device hardware 102. The completion of the micro-architectural events may gate access to the time counter 1504. Examples of micro-architectural events include, but are not limited to, Level 1 cache miss resulting in Level 2 cache read, Level 2 cache miss resulting in Level 3 cache read, Level 3 or Level 4 cache miss resulting in system memory read, Translation Look aside Buffer miss resulting in a page-table walk, branch mis-prediction resulting in speculative execution of incorrect instructions, and pipeline stalls. In certain implementations, pipeline stalls may be introduced by injecting NOPs (i.e, no-operation bubbles) into the execution pipeline.

Once the one or more micro-architectural event are completed, the execution flow may be allowed access to the timer value from the time counter 1504. In certain instances, the random delay added before accessing the time counter 1504 results in an indeterminate result for a request for the time value from the VM, therefore making it increasing difficult for an attacker to mount a side-channel attack using timing techniques for shared hardware resources.

Figure 16:
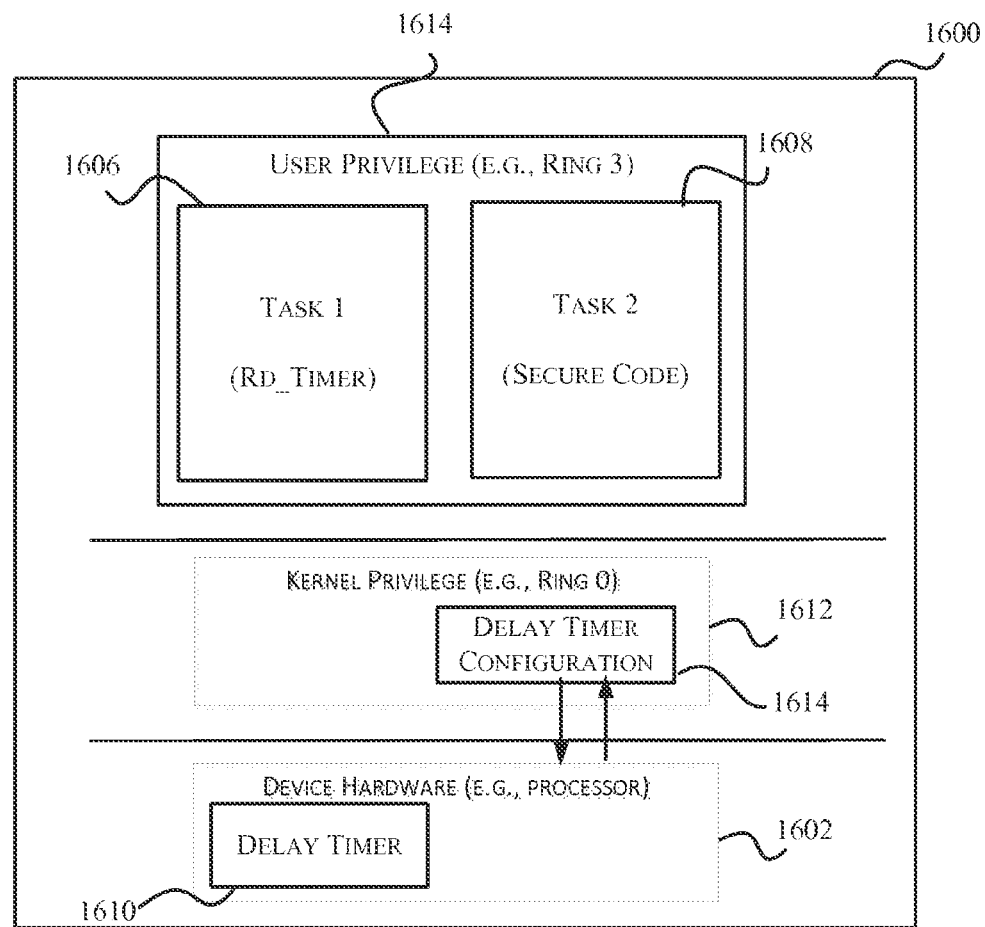
FIG. 16 is a block diagram illustrating techniques for providing a delay timer value instead of the timer value, according to certain embodiments of the disclosure.

FIG. 16 is a block diagram illustrating techniques for providing a delayed timer value instead of the timer value, according to certain embodiments of the disclosure. Although in FIGS. 14 and 15, aspects of the disclosure have been described with respect to virtualized environments, embodiments described herein are not limited to such an environment.

FIG. 16 illustrates device hardware 1602 executing privileged code in kernel privilege 1612. Device hardware 1602 may include one or more processors, besides other components for operating a computing system. In certain implementations, the processors may provide hardware support for virtualizing the timer values for specific tasks. Examples of such processors may include but are not limited to Intel®, Qualcomm® and AMD® processors. Similar to what has been discussed before, for example, with reference to FIG. 1, certain processors may be architected to share hardware resources, when possible, for more efficiently utilizing certain hardware components. For example, multiple processing cores may share caches and certain busses on the processor. Furthermore, in some implementations, multiple execution threads may operate on the same processor sharing the execution pipeline and level 1 and level 2 caches. Such sharing of hardware resources between tasks operating on the processor may enable side-channel attacks by a malicious task to retrieve sensitive information from a task executing or that may include sensitive information.

In certain implementations, privileged code/binary executing at kernel privilege 1612 may include operating system code/binary running at very high privilege levels on the device hardware. In certain aspects, the level of privilege may determine the level of direct access and control of the hardware resources. Traditionally, the kernel of the operating systems and drivers operate at kernel privilege level 1612 (e.g., Ring 0 privilege level), and tasks such as applications and processes operate at user privilege level 1614 (e.g., Ring 3 privilege level).

The binary executing at kernel privilege 1612 manages a first task 1606 and a second task 1608. In one scenario, second task 1608 may be a security sensitive task. An example of a security sensitive task may include an encryption operation performed by second task 1608 to establish a secure communication channel, such as a user logging into their bank account. On the other hand, first task 1606 may be a malicious task. As shown in FIG. 16, first task 1606 may be configured to mount a side-channel attack by executing one or more read timer commands to measure the response time for certain accesses to shared processor resources such as caches, buffers and busses.

In certain embodiments, a task may refer to a group of executable instructions. Example of a task may include a processing thread, a process or an application that may include multiple processes.

Furthermore, in certain implementations, FIG. 16 comprises delay timer configuration module 1614 and delay timer module 1610. Delay timer configuration module 1612 may be implemented as part of kernel privilege 1612 in the operating system, and delay timer module 1610 may be implemented as part of device hardware 1602, such as the processor (hardware or microcode).

In certain implementations, delay timer configuration module 1614 may configure device 1600 such that all requests for reading the time stamp counter (TSC) from the hardware (e.g., RDTSC) from first task 1606 result in being trapped by device hardware 1602. In other words, device 1600 may be configured such that any attempt to read the timer value from first task 1606 results in delay timer module 1610 returning a delayed timer value. Delay timer configuration module 1614 may be implemented using any combination of techniques discussed above with reference to module 1402 of FIG. 14.

Delay timer module 1610 may be configured to provide first task 1606 with a delayed timer value that introduces an artificial and indeterminate amount of delay before the timer value or the time stamp counter value is accessed and provided by the hardware timer. Delay timer module 1610 may artificially inject one or more micro-architectural events prior to allowing access to the hardware timer. In some instances, one or more micro-architectural events may be selected from a plurality of micro-architectural events randomly. Delay timer module 1610 may be implemented using techniques discussed with reference to FIG. 15.

Figure 17:
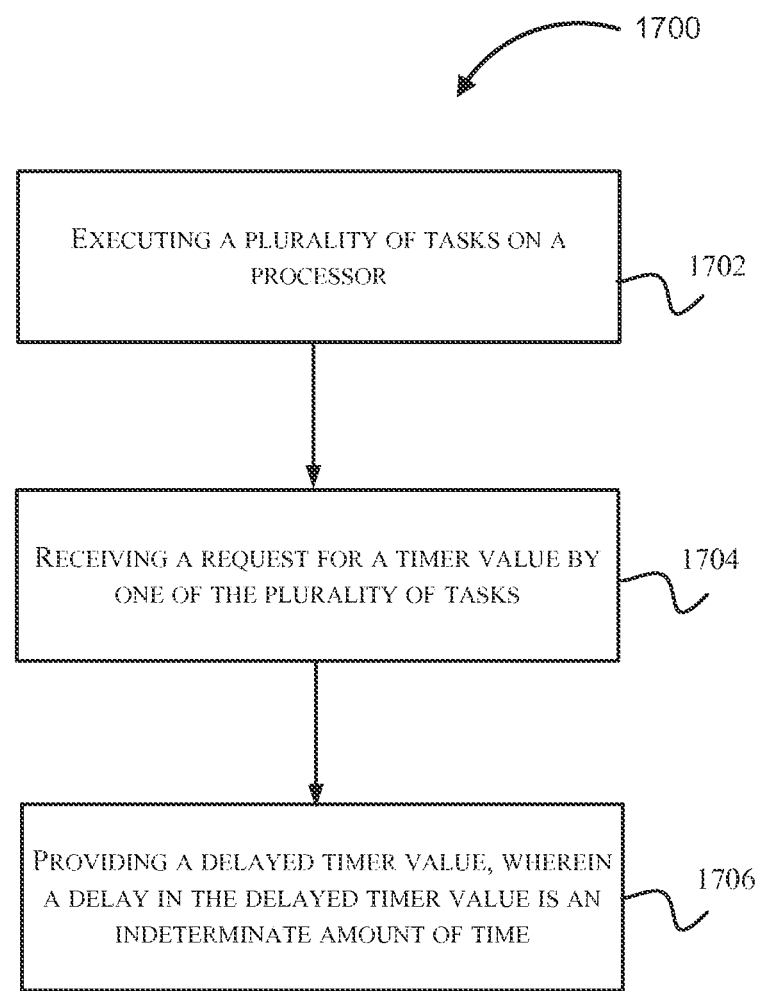
FIG. 17 illustrates a flow diagram for a method for generating a delayed timer value, according to one or more aspects of the disclosure.

FIG. 17 illustrates a flow diagram for a method for generating a delayed timer value, according to one or more aspects of the disclosure. Some or all of the process 1700 (or any other processes described herein, or variations and/or combinations thereof) may be performed under the control of one or more computer systems configured with executable instructions and may be implemented as code (e.g., firmware, executable instructions, one or more computer programs or one or more applications) executing collectively on one or more processors, or by hardware or combinations thereof. The code may be stored on a computer-readable storage medium, for example, in the form of a computer program that may include a plurality of instructions executable by one or more processors. The computer-readable storage medium may be non-transitory.

At step 1702, components of the computing device, such as a processor, execute a plurality of tasks on the processor. In certain implementations of the processor, the processor may include one or more logical processors, such multiple processing cores and/or processing threads. Each task may include a plurality of computer executable instructions. Example of a task may include a processing thread, a process or an application that may include multiple processes.

In some aspects, the plurality of tasks executing on the processor share a hardware resource associated with the processor. In some instances, the sharing of the hardware resources may allow one task to spy and steal secrets from another task operating on the processor. Examples of the shared hardware resource may include one or more of a Level 1 cache, a Level 2 cache, a Level 3 cache, Translation Look aside buffer (TLB) Write Combining Buffer, Branch Prediction Table, Branch Target Buffer, processor cycles, memory bus resource, cache access resource, I/O resource, and network resource.

In certain aspects, the plurality of tasks execute using the same execution pipeline on one of the processing cores. In certain other aspects, each of the plurality of tasks are distinct processing threads executing on logical processors associated with the processor. Furthermore, executing two tasks, in some instances, may comprise concurrently processing at least one executable instruction belonging to a first task and at least another executable instruction belonging to a second task, wherein neither of the instructions belonging to the first task or the second task has completed. In some embodiments of the disclosure, each of the plurality of tasks belongs to a separate virtual machine executing on the processor.

At step 1704, components of the computing device, such as a delay timer module may receive a request for a timer value from a first task from among a plurality of tasks, that may include instructions executing on the processor.

At step 1706, components of the computing device, such as the delay timer module may be configured to provide a delayed timer value, wherein a delay in the delayed timer value is an indeterminate amount of time. An indeterminate amount of time may refer to an amount of time that is not known and cannot be easily established or determined. In some implementations, the delay is based on a completion of at least one micro-architectural event introduced before accessing of the timer value from a hardware timer. An indeterminate amount of delay may be artificially introduced by performing one or more micro-architectural events prior to allowing access to the hardware timer. In some instances, one or more micro-architectural events may be selected from a plurality of micro-architectural events randomly. Examples of micro-architectural events include, but are not limited to one or more of Level 1 cache miss resulting in Level 2 cache read, Level 2 cache miss resulting in Level 3 cache read, Level 3 or Level 4 cache miss resulting in system memory read, Translation Look aside Buffer miss resulting in a page-table walk, branch mis-prediction resulting in speculative execution of incorrect instructions, and pipeline stalls. The delay timer value may be generated using any combination of techniques described with reference to FIG. 15.

It should be appreciated that the specific steps illustrated in FIG. 17 provide a particular method of switching between modes of operation, according to one embodiment. Other sequences of steps may also be performed in alternate embodiments. For example, alternative embodiments may perform the steps/blocks outlined above in a different order. To illustrate, a user may choose to change from the third mode of operation to the first mode of operation, the fourth mode to the second mode, or any combination therebetween. Moreover, the individual steps/blocks illustrated in FIG. 17 may include multiple sub-steps that may be performed in various sequences as appropriate to the individual step. Furthermore, additional steps/blocks may be added or removed depending on the particular applications. One of ordinary skill in the art would recognize and appreciate many variations, modifications and alternatives of the process.

It should also be noted that techniques described in FIGS. 1-17 may be in combination with each other without deviating from the scope of the invention. For example, in some implementations, aspects of both a delay timer module (e.g., FIGS. 14-17) and a virtual timer module (FIGS. 2-13) may be implemented without deviating from the scope of the invention.

Figure 18:
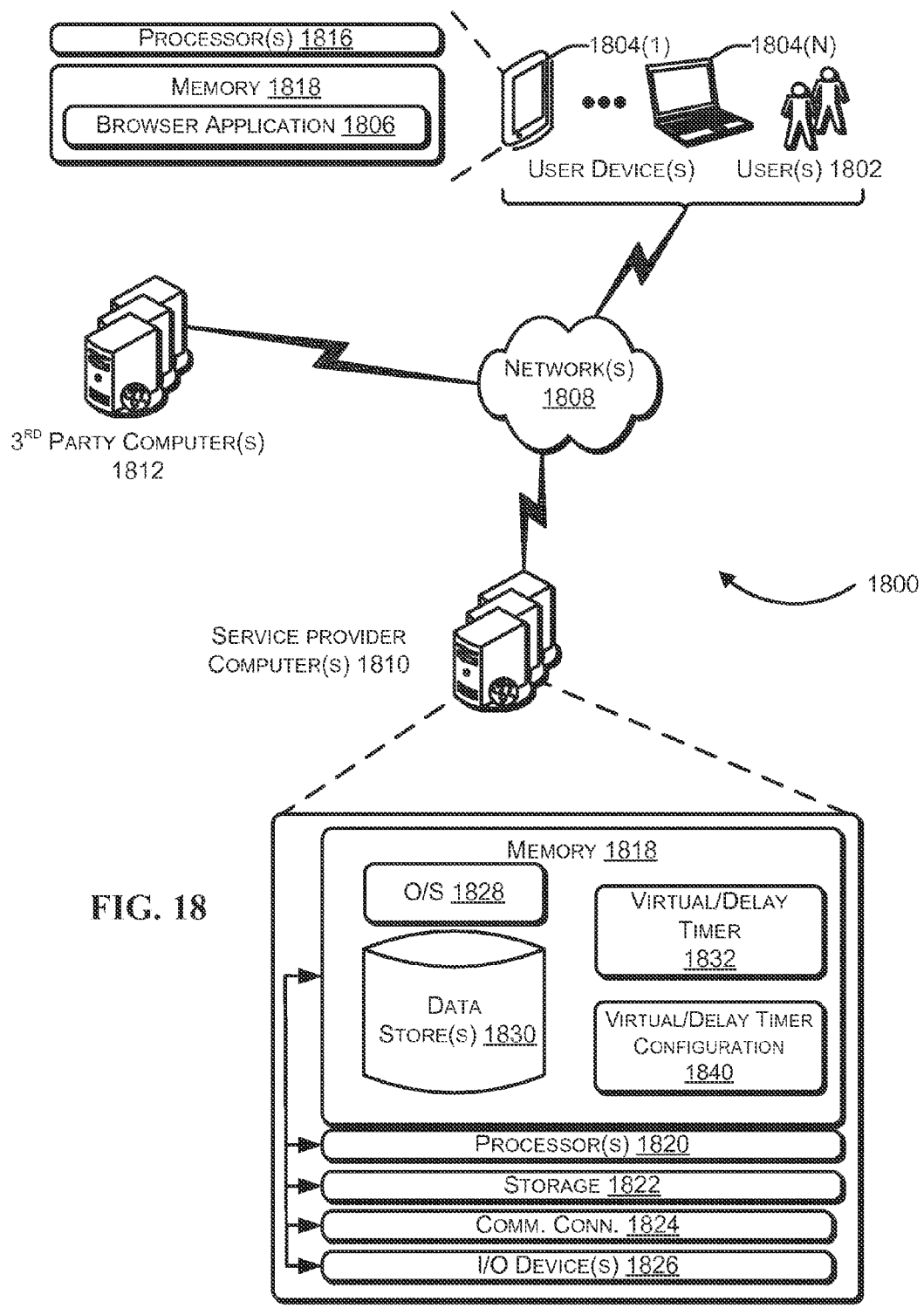
FIG. 18 illustrates an exemplary architecture for features and systems described herein that includes one or more service provider computers and/or a user device connected via one or more networks, according to at least one exemplary embodiment.

FIG. 18 illustrates an exemplary architecture for features and systems described herein that includes one or more service provider computers and/or a user device connected via one or more networks, according to at least one exemplary embodiment. The devices discussed in FIGS. 1-17, may use one or more components of the computing devices described in FIG. 18 or may represent one or more computing devices described in FIG. 18. In architecture 1800, one or more users 1802 may utilize user computing devices 1804(1)-(N) (collectively, user devices 1804) to access application 1806 (e.g., a web browser or mobile device application), via one or more networks 1808. In some aspects, application 1806 may be hosted, managed and/or provided by a computing resources service or service provider. One or more service provider computers 1810 may provide a native application which is configured to run on user devices 1804 which user(s) 1802 may interact with. Service provider computer(s) 1810 may, in some examples, provide computing resources such as, but not limited to, client entities, low latency data storage, durable data storage, data access, management, virtualization, cloud-based software solutions, electronic content performance management, etc. Service provider computer(s) 1810 may also be operable to provide web hosting, computer application development and/or implementation platforms, combinations of the foregoing or the like to user(s) 1802. Service provider computer(s) 1810, in some examples, may communicate with one or more third party computers 1812.

In some examples, network(s) 1808 may include any one or a combination of many different types of networks, such as cable networks, the Internet, wireless networks, cellular networks and other private and/or public networks. While the illustrated example represents user(s) 1802 accessing application 1806 over network(s) 1808, the described techniques may equally apply in instances where user(s) 1802 interact with service provider computer(s) 1810 via user device(s) 1804 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 1806 may allow user(s) 1802 to interact with service provider computer(s) 1810 such as to access web content (e.g., web pages, music, video, etc.). Service provider computer(s) 1810, perhaps arranged in a cluster of servers or as a server farm, may host application 1806 and/or cloud-based software services. Other server architectures may also be used to host application 1806. Application 1806 may be capable of handling requests from many users 1802 and serving, in response, various item web pages. Application 1806 can provide any type of website that supports user interaction, including social networking sites, online retailers, informational sites, blog sites, search engine sites, news and entertainment sites and so forth. As discussed above, the described techniques can similarly be implemented outside of application 1806, such as with other applications running on user device(s) 1404.

User device(s) 1804 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 1804 may be in communication with service provider computer(s) 1810 via network(s) 1808, or via other network connections. Additionally, user device(s) 1804 may be part of the distributed system managed by, controlled by or otherwise part of service provider computer(s) 1810 (e.g., a console device integrated with service provider computers 1810).

In one illustrative configuration, user device(s) 1804 may include at least one memory 1814 and one or more processing units (or processor(s)) 1816. Processor(s) 1816 may be implemented as appropriate in hardware, computer-executable instructions, firmware, or combinations thereof. Computer-executable instruction or firmware implementations of processor(s) 1816 may include computer-executable or machine-executable instructions written in any suitable programming language to perform the various functions described. User device(s) 1804 may also include geo-location devices (e.g., a global positioning system (GPS) device or the like) for providing and/or recording geographic location information associated with user device(s) 1804.

Memory 1814 may store program instructions that are loadable and executable on processor(s) 1816, as well as data generated during the execution of these programs. Depending on the configuration and type of user device(s) 1804, memory 1814 may be volatile (such as random access memory (RAM)) and/or non-volatile (such as read-only memory (ROM), flash memory, etc.). User device(s) 1804 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 1814 may include multiple different types of memory, such as static random access memory (SRAM), dynamic random access memory (DRAM), or ROM.

Turning to the contents of memory 1814 in more detail, memory 1814 may include an operating system and one or more application programs or services for implementing the features disclosed herein including at least a user provided input element or electronic service web page, such as via browser application 1806 or dedicated applications (e.g., smart phone applications, tablet applications, etc.). Browser application 1806 may be configured to receive, store and/or display a website or other interface for interacting with service provider computer(s) 1810. Additionally, memory 1814 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 1804.

In some aspects, service provider computer(s) 1810 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, service provider computer(s) 1810 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 1810 may be in communication with user device(s) 1804 and/or other service providers via network(s) 1808, or via other network connections. Service provider computer(s) 1810 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, service provider computer(s) 1810 may include at least one memory 1818 and one or more processing units (or processor(s)) 1820. Processor(s) 1820 may be implemented as appropriate in hardware, computer-executable instructions, firmware or combinations thereof. Computer-executable instruction or firmware implementations of processor(s) 1820 may include computer-executable or machine-executable instructions written in any suitable programming language to perform the various functions described.

In some instances, hardware processor(s) 1820 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 1818 may store program instructions that are loadable and executable on processor(s) 1820, as well as data generated during the execution of these programs. Depending on the configuration and type of service provider computer(s) 1810, memory 1818 may be volatile (such as RAM) and/or non-volatile (such as ROM, flash memory, etc.). Service provider computer(s) 1810 or servers may also include additional storage 1822, which may include removable storage and/or non-removable storage. The additional storage 1822 may include, but is not limited to, magnetic storage, optical disks and/or tape storage. The disk drives and their associated computer-readable media may provide non-volatile storage of computer-readable instructions, data structures, program modules and other data for the computing devices. In some implementations, memory 1818 may include multiple different types of memory, such as SRAM, DRAM, or ROM.

Memory 1818, the additional storage 1822, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. Memory 1818 and the additional storage 1822 are all examples of computer storage media. Additional types of computer storage media that may be present in service provider computer(s) 1810 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 1810. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 1810 may also contain communications connection(s) 1824 that allow service provider computer(s) 1810 to communicate with a stored database, another computing device or server, user terminals and/or other devices on network(s) 1808. Service provider computer(s) 1810 may also include I/O device(s) 1826, such as a keyboard, a mouse, a pen, a voice input device, a touch input device, a display, speakers, a printer and the like.

Memory 1818 may include an operating system 1828, one or more data stores 1830 and/or one or more application programs or services for implementing the features disclosed herein, including optionally a virtual/delay timer module 1832 and a virtual/delay timer configuration module 1840. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 18, and/or functions described herein can be provided by one or more modules that exist as separate modules and/or module functions described herein can be spread over multiple modules.

Figure 19:
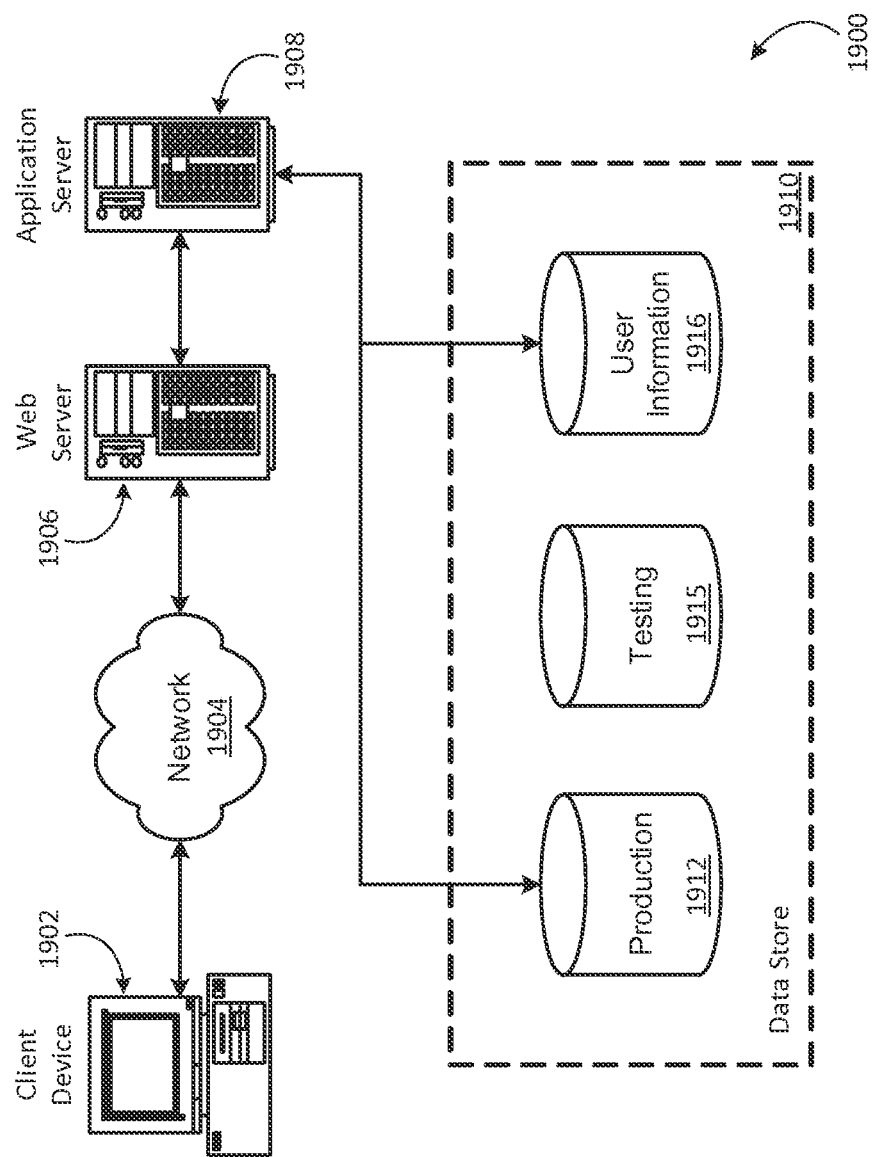
FIG. 19 illustrates an environment in which various embodiments can be implemented.

FIG. 19 illustrates aspects of an exemplary environment 1900 for implementing various embodiments. As will be appreciated, although a Web-based environment is used for purposes of explanation, different environments may be used, as appropriate, to implement various embodiments. The environment includes an electronic client device 1902, which can include any appropriate device operable to send and receive requests, messages or information over an appropriate network 1904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1906 for receiving requests and serving content in response thereto, although for other networks an alternative device serving a similar purpose could be used as would be apparent to one of ordinary skill in the art.

The illustrative environment includes at least one application server 1908 and a data store 1910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between client device 1902 and application server 1908, can be handled by the Web server. It should be understood that the Web and application servers are not required and are merely example components, as structured code discussed herein can be executed on any appropriate device or host machine as discussed elsewhere herein.

Data store 1910 can include several separate data tables, databases or other data storage mechanisms and media for storing data relating to a particular aspect. For example, the data store illustrated includes mechanisms for storing production data 1912 and user information 1916, which can be used to serve content for the production side. The data store may also include a mechanism for storing log data, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in data store 1910. Data store 1910 is operable, through logic associated therewith, to receive instructions from application server 1908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on user device 1902. Information for a particular item of interest can be viewed in a dedicated page or window of the browser. Several different types of devices, such as user devices and servers have been described with reference to FIG. 19. The devices discussed in FIGS. 1-17, may use one or more components of the devices described in FIG. 19 and/or represent one or more devices described in FIG. 19.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 19. Thus, the depiction of system 1900 in FIG. 19 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

In various embodiments, a CPU may be referred to as a hardware processor or processing unit. In some instances, the processor may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core, that supports multiple logical processors, several stages of the execution pipeline and also lower level caches may also be shared.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individu-

What is claimed is:

1. A computing device, comprising:
   a processor comprising one or more processing cores operating in a multi-tenant environment, wherein
      the one or more processing cores are configured to execute at least a first virtual machine and a second virtual machine simultaneously, and
      the first virtual machine comprising a first plurality of computer executable instructions for a first tenant and the second virtual machine comprising a second plurality of computer executable instructions for a second tenant;
   a hardware resource configured to be shared by the first virtual machine and the second virtual machine executing simultaneously on the one or more processing cores;
   a hardware timer configured to generate a timer value using at least a phase locked loop; and
   a delay timer module, using hardware logic or microcode, configured to delay accessing the timer value from the hardware timer in response to a request for the timer value, wherein the delay is based on a completion of at least one micro-architectural event introduced before accessing of the timer value from the hardware timer, wherein the at least one micro-architectural event is one or more of a Level 1 cache miss resulting in Level 2 cache read, a Level 2 cache miss resulting in Level 3 cache read, a Level 3 or Level 4 cache miss resulting in system memory read, a Translation Look aside Buffer miss resulting in a page-table walk, a branch mis-prediction resulting in speculative execution of an incorrect instruction, or a pipeline stall.

2. The computing device of claim 1, wherein the hardware resource is one or more of a Level 1 cache, a Level 2 cache, a Level 3 cache, a Translation Look-aside Buffer (TLB), a Write Combining Buffer, a Branch Prediction Table, a Branch Target Buffer, a memory bus resource, an I/O resource, or a network resource.

3. A computing device, comprising:
   a processor comprising one or more processing cores, wherein each processing core is configured to execute a plurality of tasks, wherein each task comprises a plurality of computer executable instructions;
   a hardware resource configured to be shared by the plurality of tasks simultaneously executing on the one or more processing cores; and
   a delay timer module, using hardware logic or microcode, configured to delay accessing a timer value, by an indeterminate amount of time, in response to a request for the timer value, wherein the indeterminate amount of time is based on a completion of at least one micro-architectural event introduced before accessing of the timer value to delay the accessing of the timer value.

4. The computing device of claim 3, wherein the hardware resource is one or more of a Level 1 cache, a Level 2 cache, a Level 3 cache, a Translation Look-aside Buffer (TLB), a Write Combining Buffer, a Branch Prediction Table, a Branch Target Buffer, a memory bus resource, an I/O resource, or a network resource.

5. The computing device of claim 3, wherein the at least one micro-architectural event is one or more of a Level 1 cache miss resulting in Level 2 cache read, a Level 2 cache miss resulting in Level 3 cache read, a Level 3 or Level 4 cache miss resulting in system memory read, a Translation Look aside Buffer miss resulting in a page-table walk, a branch mis-prediction resulting in speculative execution of an incorrect instruction, or a pipeline stall.

6. The computing device of claim 3, wherein the delay timer module is configured to delay accessing a timer value based on determining that one or more control bits in a register are set for a task requesting the timer value.

7. The computing device of claim 3, wherein the delay timer module is implemented in the microcode for the processor.

8. The computing device of claim 3, wherein the plurality of tasks execute using a same execution pipeline on one of the processing cores.

9. The computing device of claim 3, wherein the at least one micro-architectural event is randomly selected from a plurality of micro-architectural events.

10. The computing device of claim 3, wherein simultaneously executing a first task and a second task of the plurality of tasks comprises concurrently processing at least one executable instruction belonging to the first task and at least another executable instruction belonging to the second task, wherein neither of the instructions belonging to the first task and the second task have completed execution.

11. The computing device of claim 3, wherein each of the plurality of tasks belongs to a separate virtual machine executing on the processor.

12. A method, comprising:
   executing a plurality of tasks on a processor, the processor comprising one or more processing cores and each task comprising a respective plurality of computer executable instructions;
   receiving a request for a timer value from a first task from the plurality of tasks; and
   providing, to the first task, a delayed timer value, wherein a delay in the delayed timer value is an indeterminate amount of time, wherein the indeterminate amount of time is based on a completion of at least one micro-architectural event introduced before accessing of the timer value and wherein the at least one micro-architectural event is randomly selected from a plurality of micro-architectural events.

13. The method of claim 12, wherein the plurality of tasks executing on the processor share a hardware resource associated with the processor.

14. The method of claim 13, wherein the hardware resource is one or more of a Level 1 cache, a Level 2 cache, a Level 3 cache, a Translation Look-aside Buffer (TLB), a Write Combining Buffer, a Branch Prediction Table, a Branch Target Buffer, a memory bus resource, an I/O resource, or a network resource.

15. The method of claim 12, wherein the at least one micro-architectural event is one or more of a Level 1 cache miss resulting in Level 2 cache read, a Level 2 cache miss resulting in Level 3 cache read, a Level 3 or Level 4 cache miss resulting in system memory read, a Translation Look aside Buffer miss resulting in a page-table walk, a branch mis-prediction resulting in speculative execution of an incorrect instruction, or a pipeline stall.

16. The method of claim 12, wherein each of the plurality of tasks belongs to a separate virtual machine executing on the processor.

* * * * *